US006862167B1

(12) United States Patent
Banno et al.

(10) Patent No.: US 6,862,167 B1
(45) Date of Patent: Mar. 1, 2005

(54) ELECTROLYTE COMPOSITION FOR ELECTRIC DOUBLE-LAYER CAPACITOR, SOLID POLYMER ELECTROLYTE, COMPOSITION FOR POLARIZED ELECTRODE, POLARIZABLE ELECTRODE, AND ELECTRIC DOUBLE-LAYER CAPACITOR

(75) Inventors: Kimiyo Banno, Chiba (JP); Takaya Sato, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/297,386

(22) PCT Filed: Jun. 7, 2000

(86) PCT No.: PCT/JP00/03688

§ 371 (c)(1),
(2), (4) Date: Dec. 6, 2002

(87) PCT Pub. No.: WO01/95351

PCT Pub. Date: Dec. 13, 2001

(51) Int. Cl.[7] .............................. H01G 9/00; H01G 9/02
(52) U.S. Cl. ........................ 361/502; 361/525; 252/62.2
(58) Field of Search ................................. 361/502–508, 361/523, 525–527; 252/62.2; 423/445 R

(56) References Cited

U.S. PATENT DOCUMENTS 5,571,392 A 11/1996 Sato et al.

FOREIGN PATENT DOCUMENTS

| EP | 0 714 149 A1 | 5/1996 |
|---|---|---|
| JP | 2-38451 A | 2/1990 |
| JP | 6-302472 A | 10/1994 |
| JP | 8-225626 A | 9/1996 |
| JP | 0 838 487 A2 | 4/1998 |
| JP | 10 204172 A | 8/1998 |
| JP | 10-204172 A | 8/1998 |
| JP | 11-242951 A | 9/1999 |
| JP | 2000-82329 A | 3/2000 |

OTHER PUBLICATIONS

R. Tokar et al.: Macromol. Chem. Phys. (1995) 196, pp. 1963–1970.

A. Dworak et al.: Macromolecules (1994), 27, pp. 320–322.

*Primary Examiner*—Eric Thomas
(74) *Attorney, Agent, or Firm*—Birch, Stewart, Kolasch & Birch, LLP

(57) ABSTRACT

An electrolyte composition and a solid polymer electrolyte for electrical double-layer capacitors are endowed with high ionic conductivity. The invention is also directed at a polar electrode composition and a polar electrode having excellent binder capabilities which are able to strongly bond a high surface area material such as activated carbon and an electrically conductive material to a current collector, and which also have shape stability. A high-performance electrical double-layer capacitor arrived at using the above compositions and components is additionally disclosed.

29 Claims, 2 Drawing Sheets

US 6,862,167 B1

ELECTROLYTE COMPOSITION FOR ELECTRIC DOUBLE-LAYER CAPACITOR, SOLID POLYMER ELECTROLYTE, COMPOSITION FOR POLARIZED ELECTRODE, POLARIZABLE ELECTRODE, AND ELECTRIC DOUBLE-LAYER CAPACITOR

TECHNICAL FIELD

The present invention relates to electrolyte compositions and solid polymer electrolytes for electrical double-layer capacitors that are highly suitable for use in a wide range of applications such as backup power supplies for various types of electrical and electronic equipment. The invention also relates to polar electrode compositions and polar electrodes, as well as to electrical double-layer capacitors arrived at using these compositions and components.

BACKGROUND ART

Electrical double-layer capacitors are currently employed as backup power supplies for computer memories. These capacitors, which make use of the electrical double layer that forms at the interface between an electrode and a liquid electrolyte, have a small size, a large capacitance and a long cycle life.

Recent rapid advances in portability and cordless features in consumer electronic devices such as mobile phones have led to a heightened demand for electrical double-layer capacitors. In particular, electrical double-layer capacitors which use nonaqueous electrolytes have a higher voltage and energy density than those made using aqueous electrolytes. Such capacitors are viewed as holding special promise for backing up power in various types of electrical and electronic equipment, power regeneration in transport devices such as electric cars, and power storage, and have thus been the object of accelerated research efforts.

Secondary cells were once used for such applications. However, electrical double-layer capacitors have come into widespread use as lower power consumption by electronic equipment has reduced backup current requirements, and because of the longer cycle life and broader service temperature range of the capacitors themselves.

Such electrical double-layer capacitors have a construction in which a separator lies between a pair of polar electrodes. The separator is generally impregnated with an electrolyte solution. The polar electrodes have been built by adding to a binder a high surface area material such as activated carbon and an electrically conductive material for improving electrode conductivity, preparing the mixture as a slurry, then coating the slurry onto a metallic current collector such as aluminum foil so as to support the slurry components.

Examples of binders that have been used in electrical double-layer capacitors to support the high surface area material such as activated carbon, the conductive material and other components on the metallic current collector include polytetrafluoroethylene (PTFE), polyvinylidene fluoride, polyvinyl pyrrolidone and carboxymethylcellulose. Of these, polyvinylidene fluoride has excellent film-formability.

However, none of these binders has the ability to dissolve ion-conductive salts to a high concentration or itself possesses a high ionic conductivity. Even were such a binder to dissolve an ion-conductive salt to a high concentration, it would crystallize, preventing the free migration of ions. In addition, to lower the interfacial resistance between the polar electrodes and the electrolyte (separator), it is desirable for a binder resin sharing some of the same components as the electrolyte (separator) to be used as the binder in the polar electrodes.

It is apparent from the above that the performance of binder resins for polar electrodes and the electrolyte compositions for electrical double-layer capacitors hitherto described in the literature leaves something to be desired. A need has thus been felt for further improvement.

DISCLOSURE OF THE INVENTION

The present invention was conceived in light of the above circumstances. One object of the invention is to provide electrolyte compositions and solid polymer electrolytes for electrical double-layer capacitors, which compositions and electrolytes have a high ionic conductivity. Another object of the invention is to provide polar electrode compositions and polar electrodes endowed with excellent binder capabilities that can strongly bond a high surface area material and an electrically conductive material to a current collector, and also having a high dielectric constant and good shape stability. A further object of the invention is to provide high-performance electrical double-layer capacitors which can be arrived at using these compositions and components.

To achieve the foregoing objects, the present invention provides the subsequently described electrolyte compositions and solid polymer electrolytes for electrical double-layer capacitors, polar electrode compositions and polar electrodes, and electrical double-layer capacitors.

Accordingly, a first aspect of the invention provides an electrolyte composition for electrical double-layer capacitors, comprising:
(A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, $H(OR^2)_m$— groups (wherein $R^2$ is an alkylene group of 2 to 4 carbons, and m is an integer from 1 to 100) and phosphorus atom-containing groups; and
(B) an ion conductive salt.

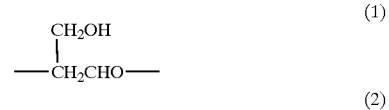

A second aspect of the invention provides an electrolyte composition for electrical double-layer capacitors, comprising:
(A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, $H(OR^2)_m$— groups (wherein $R^2$ is an alkylene group of 2 to 4 carbons, and m is an integer from 1 to 100) and phosphorus atom-containing groups;
(B) an ion-conductive salt; and
(C) a compound having crosslinkable functional groups.

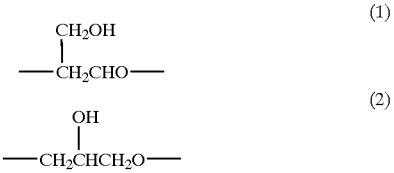

A third aspect of the invention provides the electrolyte composition of the above first or second aspect of the invention, wherein the end-capping monovalent groups are cyano group-substituted monovalent hydrocarbon groups or cyano group-substituted monovalent hydrocarbon groups and $R^1{}_3Si$— groups.

A fourth aspect of the invention provides a solid polymer electrolyte for electrical double-layer capacitors, which electrolyte has a semi-interpenetrating polymer network structure in which molecular chains on the polymeric compound (A) are interlocked with the three-dimensional network structure of a polymer obtained by crosslinking the compound (C), and contains the ion-conductive salt (B).

A fifth aspect of the invention provides a polar electrode composition comprising:
(A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, $H(OR^2)m$- groups (wherein $R^2$ is an alkylene group of 2 to 4 carbons, and m is an integer from 1 to 100) and phosphorus atom-containing groups;
(D) a high surface area material; and
(E) an electrically conductive material.

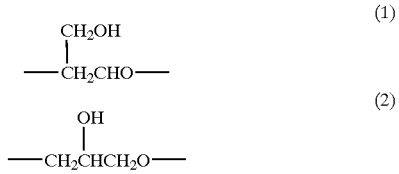

A sixth aspect of the invention provides a polar electrode composition comprising:
(A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, $H(OR^2)_m$— groups (wherein $R^2$ is an alkylene group of 2 to 4 carbons, and m is an integer from 1 to 100) and phosphorus atom-containing groups;
(C) a compound having crosslinkable functional groups;
(D) a high surface area material; and
(E) an electrically conductive material.

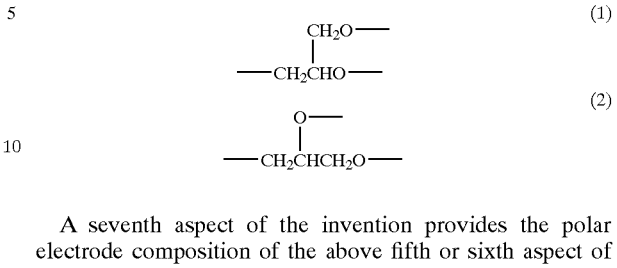

A seventh aspect of the invention provides the polar electrode composition of the above fifth or sixth aspect of the invention, wherein the end-capping monovalent groups are cyano group-substituted monovalent hydrocarbon groups or cyano group-substituted monovalent hydrocarbon groups and $R^1{}_3Si$— groups.

An eighth aspect of the invention provides a polar electrode produced by coating the polar electrode composition of the above fifth, sixth or seventh aspect of the invention onto a current collector.

A ninth aspect of the invention provides an electrical double-layer capacitor comprising a pair of polar electrodes with a separator disposed therebetween, wherein the pair of polar electrodes are polar electrodes according to the above eighth aspect of the invention and the separator is composed of a separator substrate impregnated with an ion-conductive salt-containing solution.

A tenth aspect of the invention provides an electrical double-layer capacitor comprising a pair of polar electrodes with a separator disposed therebetween, wherein the pair of polar electrodes are polar electrodes according to the above eighth aspect and the separator is composed of a separator substrate coated or impregnated with the electrolyte composition for electrical double-layer capacitors of the above first, second or third aspect of the invention.

An eleventh aspect of the invention provides an electrical double-layer capacitor comprising a pair of polar electrodes with a separator disposed therebetween, wherein the pair of polar electrodes are polar electrodes according to the above eighth aspect and the separator is a solid polymer electrolyte layer composed of the electrolyte composition for electrical double-layer capacitors of the above first, second or third aspect of the invention.

A twelfth aspect of the invention provides an electrical double-layer capacitor comprising a pair of polar electrodes with a separator disposed therebetween, wherein the pair of polar electrodes are polar electrodes according to the above eighth aspect and the separator is a solid polymer electrolyte for electrical double-layer capacitors according to the above fourth aspect of the invention.

The inventors have conducted extensive and repeated investigations in order to achieve the above objects. As a result, they have discovered that an electrolyte composition for electrical double layer capacitors which is composed primarily of a certain type of polyglycidol derivative in combination with an ion-conductive salt, has a high ionic conductivity and other excellent characteristics such as flame retardance, hydrophobic properties and a high dielectric constant. The polyglycidol derivative is a polymer (polyglycidol) that is amorphous due to the interlocking of its highly branched molecular chains, in which the ends of the molecular chains have been capped with various types of substituents. It has the ability to dissolve many ion-conductive salts, does not crystallize and thus remains non-crystalline even when it has dissolved such ion-conductive salts to a high concentration, and allows the free movement of ions.

The inventors have also found that an electrolyte composition for electrical double-layer capacitors which is composed primarily of the above-described polyglycidol derivative in combination with an ion-conductive salt and a compound having crosslinkable functional groups has a semi-interpenetrating polymer network structure wherein molecular chains on the polyglycidol derivative are interlocked with the three-dimensional network structure of a polymer formed by crosslinking the compound having crosslinkable functional groups. Such a composition, with its high ionic conductivity and dramatically improved shape retention, is ideally suited for use as a separator in electrical double-layer capacitors.

Moreover, the inventors have found that the above-described polyglycidol derivatives are endowed with excellent binder capabilities which can strongly bond a high surface area material and an electrically conductive material to a current collector, and also have a high dielectric constant, making them highly suitable for use as polar electrode compositions and polar electrodes for electrical double-layer capacitors.

Pursuing their investigations even further based on these findings, the inventors have additionally found that an electrical double-layer capacitor which comprises a pair of polar electrodes made of a polar electrode composition according to the present invention and having disposed as a separator therebetween an electrolyte composition or solid polymer electrolyte for electrical double-layer capacitors according to the invention has excellent performance features, including high voltage, high energy density, high capacitance, a long cycle life, and amenability to miniaturization. These qualities make it possible to use the electrical double-layer capacitor in a broad range of applications, including backup power supplies for electrical and electronic equipment such as personal computers and mobile phones, power regeneration in transport devices such as hybrid cars and electric cars, and power storage. These discoveries ultimately led to the present invention.

BEST MODE FOR CARRYING OUT THE INVENTION

Figure 1:
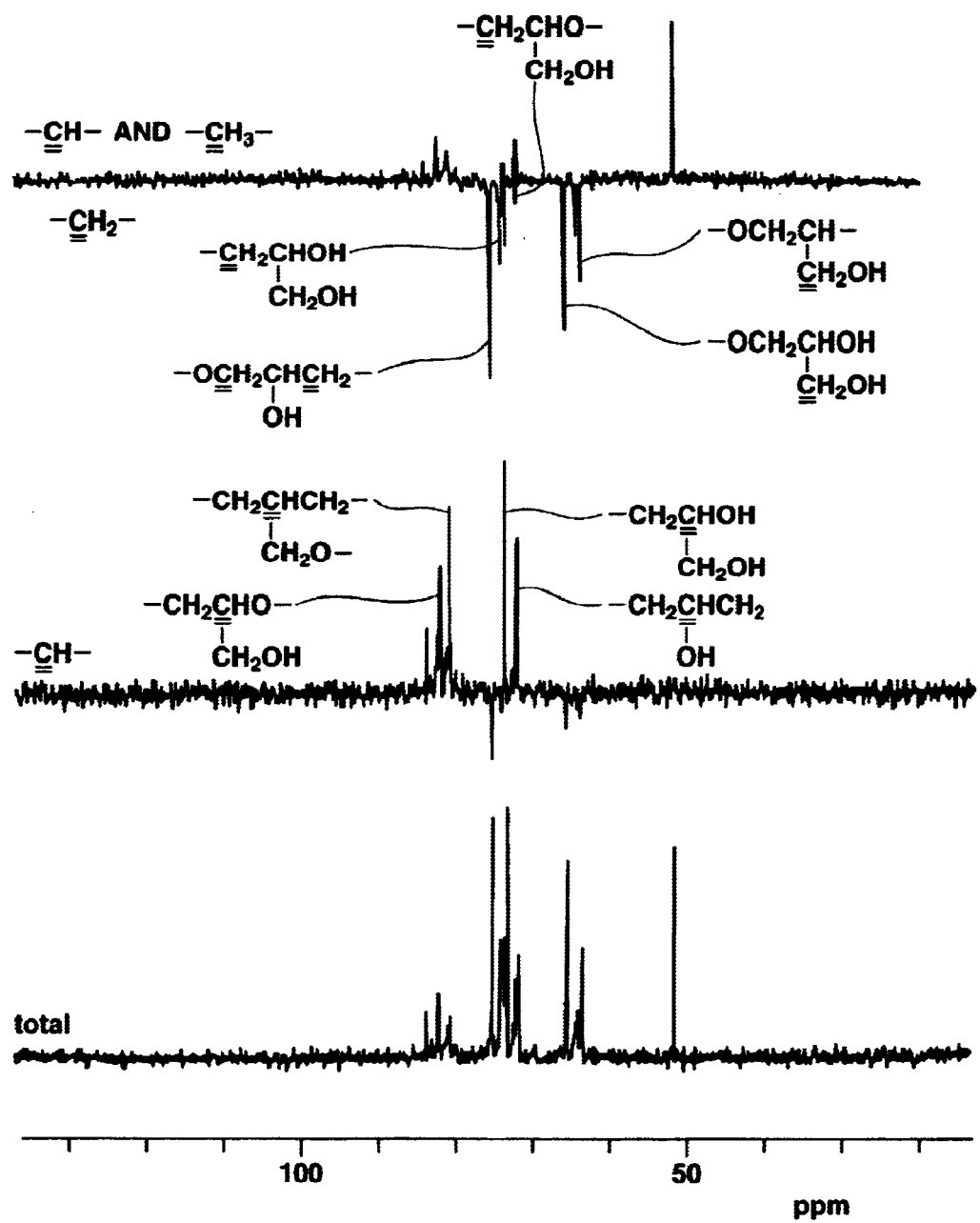
FIG. 1 is a $^{13}$C-NMR spectrum of the polyglycidol prepared in Synthesis Example 1 of the invention.

The invention is described more fully below.

The electrolyte compositions for electrical double-layer capacitors of the invention have the following first or second set of constituent components.

The first electrolyte composition is composed primarily of (A) a polymeric compound (polyglycidol derivative) containing units of the following formula (1) and units of the following formula (2) in which compound the ends of the molecular chains are capped with specific substituents; and (B) an ion-conductive salt.

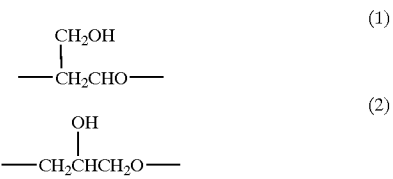

The second electrolyte composition is composed primarily of (A) the above-described polyglycidol derivative, (B) an ion-conductive salt, and (C) a compound having crosslinkable functional groups.

The first electrolyte composition for electrical double-layer capacitors of the invention comprises (A) a polymeric compound which is a polyglycidol derivative containing units of above formula (1) (referred to hereinafter as "A units") and units of formula (2) (referred to hereinafter as "B units"), and the molecular chains of which are end-capped with specific substituents; and (B) an ion-conductive salt.

Polyglycidols composed of units represented by above formulas (1) and (2) are already known and have been described by A. Dworak et al. in *Macromol. Chem. Phys.* 196, 1963–1970 (1995) and R. Tokar et al. in *Macromolecules* 27, 320–322 (1994). However, the inventors have made a number of new findings concerning such polyglycidols. (i) Because these polyglycidols have a high electrochemical stability, are colorless and transparent, and are moreover nontoxic, they can be used in a broad range of applications as electrochemical materials, including binder substances for various active materials (e.g., binders for electroluminescent devices), as thickeners, and as alkylene glycol substitutes. (ii) Such polyglycidols have the ability to dissolve ion-conductive salts to a high concentration, and do not crystallize even when an ion-conductive salt is dissolved therein to a high concentration. (iii) When such a polyglycidol having a relatively large molecular weight is combined with an ion-conductive salt and used as an electrolyte, the interlocking effect by the polyglycidol molecular chains provides a polymeric electrolyte which is solid at room temperature. (iv) The polyglycidol is able to strongly bond high surface area materials and electrically conductive materials to current collectors, thereby making it highly suitable as a binder in polar electrodes for electrical double-layer capacitors.

The above-described polyglycidol can be prepared by polymerizing glycidol or 3-chloro-1,2-propanediol, although it is generally advisable to carry out polymerization using glycidol as the starting material.

Known processes for carrying out such a polymerization reaction include (1) processes involving the use of a basic catalyst such as sodium hydroxide, potassium hydroxide or any of various amine compounds; and (2) processes involving the use of a Lewis acid catalyst (see A. Dworak et al.: *Macromol. Chem. Phys.* 196, 1963–1970 (1995); and R. Tokar et al.: *Macromolecules* 27, 320–322 (1994)).

The first type of polymerization process (1), involving the use of a basic catalyst, is usually carried out by adding an alcohol compound (active hydrogen compound) as the starting point, and does not readily provide a high-molecular-weight polymer. The reaction mechanism is shown below.

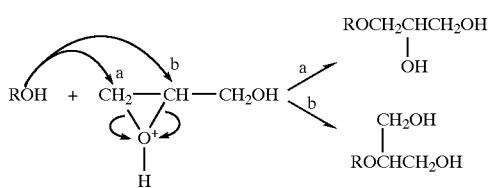

This polymerization process involves, more specifically, charging a flask with a given amount of glycidol, adding methylene chloride as the solvent, and carrying out the reaction by setting the system to a given temperature, adding a given amount of potassium hydroxide as the catalyst and stirring. An active hydrogen compound is added as needed during the reaction. Following reaction completion, methanol is added to terminate the reaction, and the methanol and methylene chloride are removed by distillation in vacuo. The resulting polymer is dissolved in water and neutralized using an ion-exchange resin, following which the ion-exchange resin is removed by filtration and the water is distilled off in vacuo to effect drying, thereby giving the polyglycidol.

Examples of active hydrogen compounds that may be used in the above procedure include alcohols such as ethanol, methanol, isopropanol and benzyl alcohol; polyols such as glycerol, pentaerythritol, sorbitol, diethylene glycol, ethylene glycol, threose, tetraose, pentose and hexose; and hydroxyl group-bearing polymeric compounds such as polyvinyl alcohol and polyethylene vinyl alcohol.

The active hydrogen compound is added in an amount, expressed as a molar ratio (number of moles of active hydrogen groups on the active hydrogen compound added)/ (number of moles of glycidol charged), within a range of 0.0001 to 1, preferably 0.001 to 1, more preferably 0.005 to 0.5, and most preferably 0.01 to 0.1.

The second type of polymerization process (2), involving the use of a Lewis catalyst, is carried out in a nonaqueous system. The reaction mechanism is shown below.

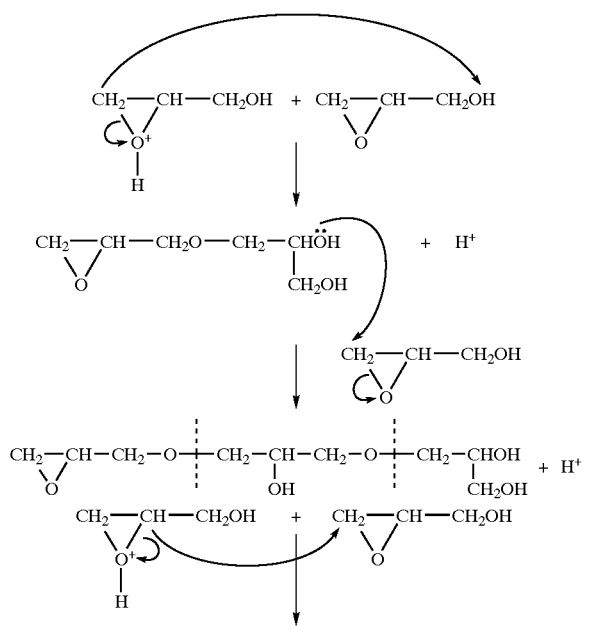

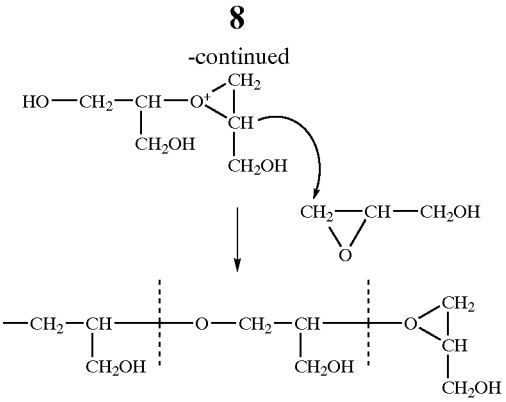

This polymerization process specifically involves charging a flask with a given amount of glycidol, using methylene chloride as a solvent if necessary, and carrying out the reaction at a given reaction temperature, with the addition of a given amount of catalyst (reaction initiator), under a stream of nitrogen gas and with stirring. Following reaction completion, methanol is added to terminate the reaction, then the methanol and methylene chloride are removed by distillation in vacuo. The resulting polymer is dissolved in water and neutralized with sodium hydrogen carbonate, after which the solution is passed through a column filled with ion-exchange resin. The solution that has passed through the column is filtered, and the filtrate is dried by distillation in vacuo, thereby giving the polyglycidol.

The catalyst (reaction initiator) used in this case may be trifluoroborate diethyl etherate ($BF_3 \cdot OEt_2$), $SnCl_4$ or $HPF_6 \cdot OEt_2$ (where "Et" stands for an ethyl group).

The polyglycidol thus prepared, when measured by $^{13}C$-NMR spectroscopy (DEPT spectrum measured using a Varian VXR-300 NMR spectrometer, with $D_2O$ as the solvent), has peaks for carbons originating in two types of units (A units and B units), from which it can be confirmed that the polyglycidol is composed of both A units and B units.

The above polyglycidol has a total number of A and B groups combined of preferably at least two, more preferably at least six, and most preferably at least ten. There is no particular upper limit, although a total number of such groups which does not exceed 10,000 is preferred. The total number of A and B units is preferably low in cases where the polyglycidol must have the flowability of a liquid, and is preferably high where a high viscosity is required.

The appearance of these A and-B units is not regular, but random. Any combination is possible, including, for example, -A-A-A, -A-A-B-, -A-B-A-, -B-A-A-, -A-B-B-, -B-A-B-, -B-B-A- and -B-B-B-.

The polyglycidol has a polyethylene glycol equivalent weight-average molecular weight (Mw), as determined by gel permeation chromatography (GPC), within a range of preferably 200 to 730,00, more preferably 200 to 100,000, and most preferably 600 to 20,000. Polyglycidol having a weight-average molecular weight of up to about 2,000 is a highly viscous liquid that flows at room temperature, whereas polyglycidol with a weight-average molecular weight above 3,000 is a soft, paste-like solid at room temperature. The average molecular weight ratio (Mw/Mn) is preferably 1.1 to 20, especially 1.1 to 10.

Depending on its molecular weight, the polyglycidol varies in appearance at room temperature (20° C.) from a highly viscous molasses-like liquid to a rubbery solid. The higher the molecular weight, the more it qualifies as a solid (albeit a soft, paste-like solid) having a low fluidity at room temperature.

Regardless of how large or small its molecular weight, the polyglycidol is not a linear polymer, but rather an amorphous polymer due to the interlocking of its highly branched molecular chains. This is evident from the absence of any peaks on the wide-angle x-ray diffraction pattern that would be indicative of the presence of crystals.

The ratio of A units to B units in the molecule can be determined by measuring the $^{29}$Si-NMR spectrum of trimethylsilylated polyglycidol (see FIG. 2) prepared by introducing trimethylsilyl groups onto the hydroxyl groups of the polyglycidol. In the present case, the molar ratio of A units to B units (A:B) is within a range of preferably 1/9 to 9/1, and especially 3/7 to 7/3.

Because the polyglycidol is colorless, transparent and nontoxic, it can be used in a broad range of applications as electrochemical materials, including binder substances for various active materials (e.g., binder for electroluminescent devices), as thickeners, and as alkylene glycol substitutes.

In the electrolyte compositions of the invention, component (A) is a polyglycidol derivative in which at least 10% of the terminal hydroxyl groups on the molecular chains of the above-described polyglycidol are capped with one or more type of monovalent group selected from among halogen atoms, substituted and unsubstituted monovalent hydrocarbon groups, $R^1CO—$ groups (wherein $R^1$ is a substituted or unsubstituted monovalent hydrocarbon group), $R^1{}_3Si—$ groups (wherein $R^1$ is as defined above), amino groups, alkylamino groups, $H(OR^2)_m—$ groups (wherein $R^2$ is an alkylene group of 2 to 4 carbons, and m is an integer from 1 to 100) and phosphorus atom-containing groups.

The purpose of capping the ends of the polyglycidol molecular chains with the above groups is two-fold.
(1) In a polymer containing a high concentration of ion-conductive salt, dissociated metal cations and counter ions (anions) will readily recombine in a low-dielectric-constant polymer matrix, lowering the conductivity. Because raising the polarity of the polymer matrix discourages ion association, one aim is to increase the dielectric constant of the matrix polymer by introducing polar groups onto the side chains (hydroxyl groups) of the polyglycidol.
(2) The second aim is to impart the polymeric compound with highly desirable characteristics, such as hydrophobic properties and fire retardance.

To increase the dielectric constant of the polymeric compound according to the first of these aims, the polyglycidol is reacted with a hydroxy-reactive compound so as to cap the hydroxyl end groups on the molecular chains of the polyglycidol with highly polar substituents.

Although the highly polar substituents used for this purpose are not subject to any particular limitation, neutral substituents are preferable to ionic substituents. Exemplary substituents include substituted and unsubstituted monovalent hydrocarbon groups, $R^1CO—$ groups (wherein $R^1$ is a substituted or unsubstituted monovalent hydrocarbon group), and $H(OR^2)_m—$ groups (wherein $R^2$ is an alkylene group of 2 to 4 carbons, and m is an integer from 1 to 100). If necessary, capping may also be carried out with other suitable substituents, such as amino groups or alkylamino groups.

The second purpose of capping mentioned above, which is to confer hydrophobic properties and fire retardance to the polymeric compound, can be achieved by the use of, for example, halogen atoms, $R^1{}_3Si—$ groups ($R^1$ being as defined above) or phosphorus-containing groups to cap the hydroxyl end groups on the molecular chains of the polyglycidol.

Examples of halogen atoms that may be used as the substituents here include fluorine, bromine and chlorine. Exemplary substituted or unsubstituted monovalent hydrocarbon groups which may be used as such substituents are substituted or unsubstituted monovalent hydrocarbon groups having 1 to 10 carbons, and preferably 1 to 8 carbons, including alkyls such as methyl, ethyl, propyl, isopropyl, butyl, isobutyl, tert-butyl, pentyl, neopentyl, hexyl, cyclohexyl, octyl, nonyl and decyl; aryls such as phenyl, tolyl and xylyl; aralkyls such as benzyl, phenylethyl and phenylpropyl; alkenyls such as vinyl, allyl, propenyl, isopropenyl, butenyl, hexenyl, cyclohexenyl and octenyl; and any of these groups in which some or all of the hydrogen atoms are substituted with, for example, halogen atoms (e.g., fluorine, bromine, chlorine), cyano groups, hydroxyl groups, $H(OR^2)_m—$ groups (wherein $R^2$ is an alkylene of 2 to 4 carbons, and m is an integer from 1 to 100), amino groups, aminoalkyl groups or phosphono groups, such as cyanoethyl, cyanobenzyl and other cyano-group bearing alkyls, chloromethyl, chloropropyl, bromoethyl and trifluoropropyl. Any one or combinations of two or more of such substituents may be used.

Examples of suitable $R^1CO—$ groups include those in which $R^1$ represents the same substituted or unsubstituted monovalent hydrocarbon groups having 1 to 10 carbons, and preferably 1 to 8 carbons, as above. $R^1$ preferably stands for an alkyl group or a phenyl group. Acyl groups, benzoyl and cyanobenzoyl are especially preferred.

Exemplary $H(OR^2)_m—$ groups are those in which $R^2$ is an alkylene of 2 to 4 carbons, such as ethylene, propylene or butylene, and m is an integer from 1 to 100, and preferably from 2 to 70. Two or more different groups from among ethyleneoxy, propyleneoxy and butyleneoxy may be present on the polymeric compound.

Examples of suitable $R^1{}_3Si—$ groups include those in which $R^1$ represents the same substituted or unsubstituted monovalent hydrocarbon groups having 1 to 10 carbons, and preferably 1 to 8 carbons, as above. $R^1$ preferably stands for alkyl groups. Trialkylsilyl groups, and especially trimethylsilyl, are preferred.

Additional examples of suitable substituents include amino groups, alkylamino groups and phosphorus-containing groups.

The proportion of end groups capped with the above substituents is at least 10 mol %, preferably at least 50 mol %, and most preferably at least 90 mol %. It is even possible to cap substantially all the end groups with the above substituents, representing a capping ratio of essentially 100 mol %.

However, because there are cases in which the ability of the polymer to dissolve the ion-conductive salt decreases when all the hydroxyl end groups on the molecular chains of the polymer are capped with halogen atoms, $R^1{}_3Si—$ groups or phosphorus-containing groups, it is essential to introduce a suitable amount of substituent while taking into account the solvent properties of the polymer. This amount, based on the total number of hydroxyl end groups, is preferably 10 to 95 mol %, more preferably 50 to 95 mol %, and most preferably 50 to 90 mol %.

The substituent used in the practice of the invention is most preferably a cyano group-substituted monovalent hydrocarbon group or both a cyano group-substituted monovalent hydrocarbon group and a $R^1{}_3Si—$ group. Illustrative examples include cyanoethyl, cyanobenzyl, cyanobenzoyl, and other alkyl groups to which a cyano group is attached, or a combination of any of these cyano group-substituted monovalent hydrocarbon groups with trimethylsilyl, for instance.

When a cyano group-substituted monovalent hydrocarbon group such as cyanoethyl is used in combination with a $R^1_3Si$— group such as trimethylsilyl, the two components are used in relative proportions of preferably 70 to 97 mol %, and especially 90 to 97 mol %, of the cyano group-substituted monovalent hydrocarbon groups, and preferably 3 to 30 mol %, and especially 3 to 10 mol %, of the $R^1_3Si$— groups, based on all the hydroxyl end groups on the molecular chains. Polyglycidol derivatives in which cyano group-substituted monovalent hydrocarbon groups and $R^1_3Si$— groups have been incorporated together in this way possess excellent electrical conductivity and hydrophobic properties.

When cyanoethyl groups are introduced as the substituent, the method for capping the molecular chains of the polyglycidol with such substituents may comprise mixing the polyglycidol with dioxane and acrylonitrile, adding a sodium hydroxide solution to the mixture, and stirring to effect the reaction. This yields a cyanoethylated polyglycidol in which cyanoethyl groups have been introduced onto some or all of the side chains.

In cases where acetyl groups are introduced as the substituent, this may be carried out by, for example, mixing the polyglycidol with acetic acid and methylene chloride, adding aqueous perchloric acid and acetic anhydride to the mixture, then reacting at room temperature under stirring. The reaction mixture is subsequently added to cold water, following which the precipitate that settles out is collected. The precipitate is dissolved in acetone, then poured once again into water. The resulting mixture is neutralized by adding sodium hydrogen carbonate, and the precipitate that forms is collected by filtration, placed together with water in dialysis tubing and dialyzed with ion-exchanged water. The resulting precipitate is collected, rinsed with water, then dried in vacuo, giving an acetylated polyglycidol.

Cyanobenzoyl groups may be introduced as the substituent by a method which involves, for example, mixing the polyglycidol with dioxane, adding pyridine, then adding dropwise a solution of cyanobenzoyl chloride in dioxane. Next, the resulting solution is reacted at a given temperature, after which the reaction mixture is poured into a methanol/water (3:4) solution. The precipitate that settles out of solution is collected and dissolved in N,N-dimethylsulfoxide, following which the solution is placed in dialysis tubing and dialyzed. The resulting precipitate is collected, rinsed with water, then dried in vacuo, giving a cyanobenzoylated polyglycidol.

The introduction of trimethylsilyl groups may be carried out by dissolving the polyglycidol in dimethylacetamide, adding bis(trimethylsilyl)acetamide to the solution, and stirring at room temperature to effect the reaction. The reaction mixture is then cooled in an ice-water bath, and poured into a cold methanol/water (4:1) solution. The precipitate that settles out is collected by filtration then dissolved in acetamide, and the resulting solution is passed through filter paper. The solution is then dried in vacuo, yielding a trimethylsilylated polyglycidol.

Capping with other suitable substituents may likewise be carried out using known techniques for introducing those substituents onto hydroxyl end groups.

Next, the polyglycidol derivative serving as component A of the first electrolyte composition for electrical double-layer capacitors according to the invention is conferred with ionic conductivity by the addition thereto of an ion-conductive salt as component B.

Any ion-conductive salt employed in conventional electrochemical devices may be used without particular limitation. Preferred examples include salts obtained by combining a quaternary onium cation of the general formula $R^1R^2R^3R^4N^+$ or $R^1R^2R^3R^4P^+$ (wherein $R^1$ to $R^4$ are each independently alkyls of 1 to 10 carbons) with an anion such as $BF_4^-$, $N(CF_3SO_2)_2^-$, $PF_6^-$ or $ClO_4^-$.

Illustrative examples include $(C_2H_5)_4PBF_4$, $(C_3H_7)_4PBF_4$, $(C_4H_9)_4PBF_4$, $(C_6H_{13})_4PBF_4$, $(C_4H_9)_3CH_3PBF_4$, $(C_2H_5)_3(Ph-CH_2)PBF_4$ (wherein Ph stands for phenyl), $(C_2H_5)_4PPF_6$, $(C_2H_5)PCF_3SO_2$, $(C_{25})_4NBF_4$, $(C_4H_9)_4NBF_4$, $(C_6H_{13})_4NBF_4$, $(C_2H_5)_6NPF_6$, $LiBF_4$ and $LiCF_3SO_3$. These may be used alone or as combinations of two or more thereof.

The amount of the ion-conductive salt incorporated as component B in the composition varies empirically according to a number of factors, including the type of ion-conductive salt used and the molecular weight of the polymeric compound. In general, the amount of ion-conductive salt included per 100 parts by weight of the polyglycidol serving as component A is preferably 5 to 1,000 parts by weight, more preferably 10 to 500 parts by weight, even more preferably 10 to 100 parts by weight, and most preferably 10 to 50 parts by weight. Too little ion-conductive salt results in a weak concentration of the ion conductor, making the conductivity too low for practical purposes. On the other hand, the capacity of the polymer matrix to dissolve the ion-conductive salt is exceeded if too much salt is used, resulting in salt deposition.

In addition to components A and B, the first electrolyte composition for electrical double-layer capacitors according to the invention may also have added thereto a conventional amount of a solvent capable of dissolving the ion-conductive salt. Illustrative examples of such solvents include chain ethers, such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, and glycol ethers (e.g., ethyl cellosolve, ethyl carbitol, butyl cellosolve, butyl carbitol); heterocyclic ethers such as tetrahydrofuran, 2-methyltetrahydrofuran, 1,3-dioxolane and 4,4-dimethyl-1,3-dioxane; butyrolactones such as γ-butyrolactone, γ-valerolactone, δ-valerolactone, 3-methyl-1,3-oxazolidin-2-one and 3-ethyl-1,3-oxazolidin-2-one; and other solvents commonly used in electrochemical devices, such as amide solvents (e.g., N-methylformamide, N,N-dimethylformamide, N-methylacetamide and N-methylpyrrolidinone), carbonate solvents (e.g., diethyl carbonate, dimethyl carbonate, ethyl methyl carbonate, propylene carbonate, ethylene carbonate and styrene carbonate), and imidazolidinone solvents (e.g., 1,3-dimethyl-2-imidazolidinone). These solvents may be used singly or as mixtures of two or more thereof.

The first electrolyte composition for electrical double-layer capacitors according to the invention varies in appearance at room temperature (20° C.) from a highly viscous molasses-like liquid to a rubbery solid. The higher the average degree of polymerization, the more it qualifies as a solid (albeit a soft, paste-like solid) having a low fluidity at room temperature.

In the first electrolyte composition for electrical double-layer capacitors of the invention, the ion-conductive salt completely dissociates in the polymeric compound. Moreover, according to conductivity measurements by the AC impedance method, when the composition contains about 9 to 15 parts by weight of the ion-conductive salt (component B) per 100 parts by weight of the polyglycidol derivative (component A), it exhibits a high ionic conductivity of about $10^{-3}$ to $10^{-4}$ S/cm. The first electrolyte composition for electrical double-layer capacitors of the invention, in addition to having a high ionic conductivity, is able to confer also a number of excellent characteristics, such as a high dielectric constant, hydrophobic properties and fire retardance, owing to the substituents used to cap terminal hydroxyl groups.

The use of a polyglycidol derivative having a small weight-average molecular weight in the first electrolyte composition of the invention gives a liquid polymer electrolyte, whereas the use of a polyglycidol derivative having a sufficiently large weight-average molecular weight (at least 3,000) gives a solid polymer electrolyte. In either case, the polymer electrolyte has a high ionic conductivity. Even as a solid, because the polymer electrolyte is a rubbery solid which readily undergoes plastic deformation, it deforms easily under stress and can thus easily be formed into a film or sheet.

The second electrolyte composition for electrical double-layer capacitors of the invention is composed primarily of (A) a polymeric compound which is a polyglycidol derivative, (B) an ion-conductive salt; and (C) a compound having crosslinkable functional groups. In this case, the polyglycidol derivative used as the polymer compound of component A, the ion-conductive salt used as component B, and the solvent capable of dissolving the ion-conductive salt may respectively be the same as component A, component B and the solvent described above in connection with the first electrolyte composition for electrical double-layer capacitors of the invention.

The compound having crosslinkable functional groups serving as component C is reacted to form a three-dimensional network structure, thereby increasing shape retention.

In other words, when a mixture of the polyglycidol derivative serving as component A and the ion-conductive salt serving as component B has added thereto a crosslinkable functional group-bearing compound serving as component C and the latter is reacted, It forms a three-dimensional network structure. The polyglycidol derivative, which is a highly branched polymeric compound, serving as component A interlocks within this three-dimensional network structure to form a firm, semi-interpenetrating polymer network (semi-IPN) structure. This structure enhances the compatibility among differing polymer chains and provides a correlating increase in cohesive strength, thus having the overall effect of dramatically increasing shape retention.

Any of the following may be used as the crosslinkable functional group-bearing compound serving as component C:

(1) and epoxy group-bearing compound in combination with a compound having two or more active hydrogens capable of reacting with the epoxy groups;
(2) an isocyanate group-bearing compound in combination with a compound having two or more active hydrogens capable of reacting with the isocyanate groups;
(3) a compound having two or more reactive double bonds.

Illustrative examples of the epoxy group-bearing compound (1) include compounds having two or more epoxy groups on the molecule, such as sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl) isocyanurate, glycerol polyglycidyl ether, trimethylpropane polyglycidyl ether, resorcinol diglycidyl ether, 1,6-hexanediol diglycidyl ether, ethylene glycol diglycidyl ether, propylene glycol diglycidyl ether, the diglycidyl ethers of ethylene-propylene glycol copolymers, polytetramethylene glycol diglycidyl ether and adipic acid diglycidyl ether.

A semi-IPN structure can be formed by reacting the above epoxy group-bearing compound with a compound having at least two active hydrogens, such as an amine, alcohol, carboxylic acid or phenol. Illustrative examples of the latter compound include polymeric polyols such as polyethylene glycol, polypropylene glycol and ethylene glycol-propylene glycol copolymers, and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis($\beta$-hydroxyethoxy)-benzene, p-xylylenediol, phenyl diethanolamine, methyl diethanolamine and polyethyleneimine, as well as other polyfunctional amines, and polyfunctional carboxylic acids.

Illustrative examples of the isocyanate group-bearing compound (2) include compounds having two or more isocyanate groups, such as tolylene diisocyanate, xylylene diisocyanate, naphthylene diisocyanate, diphenylmethane diisocyanate, biphenylene diisocyanate, diphenyl ether diisocyanate, tolidine diIsocyanate, hexamethylene diisocyanate and isophorone diisocyanate.

An isocyanato-terminal polyol prepared by reacting the above isocyanate compound with a polyol can also be used. Such compounds can be prepared by reacting an isocyanate such as diphenylmethane diisocyanate or tolylene diisocyanate with one of the polyols listed below.

In this case, the stoichiometric ratio between the isocyanate groups [NCO] on the isocyanate compound and the hydroxyl groups [OH] on the polyol compound is such as to satisfy the condition [NCO]>[OH]. The ratio [NCO]/[OH] is preferably in a range of 1.03/1 to 10/1, and especially 1.10/1 to 5/1.

Suitable examples of the polyol include polymeric polyols such as polyethylene glycol, polypropylene glycol and ethylene glycol-propylene glycol copolymers; and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis($\beta$-hydroxyethoxy)benzene, p-xylylenediol, phenyl diethanolamine, methyl diethanolamine and 3,9-bis(2-hydroxy-1,1-dimethyl)-2,4,8,10-tetraoxaspiro[5,5]-undecane.

Alternatively, instead of the polyol, an amine having two or more active hydrogens may be reacted with the isocyanate. The amine used may be one having a primary or a secondary amino group, although a primary amino group-bearing compound is preferred. Suitable examples include diamines such as ethylenediamine, 1,6-diaminohexane, 1,4-diaminobutane and piperazine: polyamines such as polyethyleneamine; and amino alcohols such as N-methyldiethanolamine and aminoethanol. Of these, diamines in which the functional groups have the same level of reactivity are especially preferred. Here again, the stoichiometric ratio between [NCO] groups on the isocyanate compound and [NH$_2$] and [NH] groups on the amine compound is such as to satisfy the condition [NCO]>[NH$_2$]+[NH].

The above isocyanate group-bearing compounds cannot by themselves form a semi-IPN structure. However, a semi-IPN structure can be formed by reacting the isocyanate group-bearing compound with a compound having at least two active hydrogens, such as an amine, alcohol, carboxylic acid or phenol. Illustrative examples of such compounds having at least two active hydrogens include polymeric polyols such as polyethylene glycol, polypropylene glycol and ethylene glycol-propylene glycol copolymers, and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis(β-hydroxyethoxy)-benzene, p-xylylenediol, phenyl diethanolamine, methyl diethanolamine and polyethyleneimine, as well as other polyfunctional amines, and polyfunctional carboxylic acids.

Illustrative examples of above reactive double bond-bearing compound (3) which may be used as the crosslinkable functional group-bearing compound serving as component C in the inventive electrolyte compositions include compounds containing two or more reactive double bonds, such as divinylbenzene, divinylsulfone, allyl methacrylate, ethylene glycol dimethacrylate, diethylene glycol dimethacrylate, triethylene glycol dimethacrylate, polyethylene glycol dimethacrylate (average molecular weight, 200 to 1,000), 1,3-butylene glycol dimethacrylate, 1,6-hexanediol dimethacrylate, neopentyl glycol dimethacrylate, polypropylene glycol dimethacrylate (average molecular weight, 400), 2-hydroxy-1,3-dimethacryloxypropane, 2,2-bis[4(methacryloxyethoxy)phenyl]propane, 2,2-bis[4-(methacryloxyethoxy-diethoxy)phenyl]propane, 2,2-bis[4-(methacryloxyethoxy-polyethoxy)phenyl]propane, ethylene glycol diacrylate, diethylene glycol diacrylate, triethylene glycol diacrylate, polyethylene glycol diacrylate (average molecular weight, 200 to 1,000), 1,3-butylene glycol diacrylate, 1,6-hexanediol diacrylate, neopentyl glycol diacrylate, polypropylene glycol diacrylate (average molecular weight, 400), 2-hydroxy-1,3-diacryloxypropane, 2,2-bis[4-(acryloxyethoxy)phenyl]propane, 2,2-bis[4-(acryloxyethoxy-diethoxy)phenyl]propane, 2,2-bis[4-(acryloxyethoxy-polyethoxy)phenyl]propane, trimethylol-propane triacrylate, trimethylolpropane trimethacrylate, tetramethylolmethane triacrylate, tetramethylolmethane tetraacrylate, water-soluble urethane diacrylate, water-soluble urethane dimethacrylate, tricyclodecane dimethanol acrylate, hydrogenated dicyclopentadiene diacrylate, polyester diacrylate and polyester dimethacrylate.

If necessary, a compound containing an acrylic,or methacrylic group may be added. Examples of such compounds include acrylates and methacrylates such as glycidyl methacrylate, glycidyl acrylate and tetrahydrofurfuryl methacrylate, as well as methacryloyl isocyanate, 2-hydroxymethylmethacrylic acid and N,N-dimethylaminoethyl-methacrylic acid. Other reactive double bond-containing compounds may be added as well, such as acrylamides (e.g., N-methylolacrylamide, methylenebisacrylamide, diacetone-acrylamide), and vinyl compounds such as vinyloxazolines and vinylene carbonate.

Here too, in order to form a semi-IPN structure, a compound having at least two reactive double bonds must be added. That is, a semi-IPN structure cannot be formed with only compounds such as methyl methacrylate that have but a single reactive double bond. Some addition of a compound bearing at least two reactive double bonds is required.

Of the reactive double bond-bearing compounds described above, especially preferred reactive monomers include polyoxyalkylene component-bearing diesters of formula (3) below. The use of the latter in combination with a polyoxyalkylene component-bearing monoester of formula (4) below is recommended.

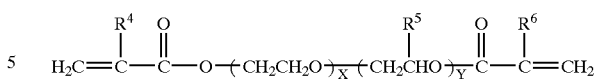

In formula (3), $R^4$, $R^5$ and $R^6$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and X and Y satisfy the condition $X \geq 1$ and $Y \geq 0$ or the condition $X \geq 0$ and $Y \geq 1$. The sum X+Y is preferably no higher than 100, and especially from 1 to 30. $R^4$, $R^5$ and $R^6$ are most preferably methyl, ethyl, n-propyl, i-propyl, n-butyl, i-butyl, s-butyl or t-butyl.

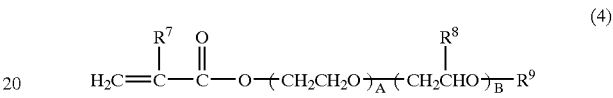

In formula (4), $R^7$, $R^8$ and $R^9$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and A and B satisfy the condition $A \geq 1$ and $B \geq 0$ or the condition $A \geq 0$ and $B \geq 1$. The sum A+B is preferably no higher than 100, and especially from 1 to 30. $R^7$, $R^8$ and $R^9$ are most preferably methyl, ethyl, n-propyl, i-propyl, n-butyl, i-butyl, s-butyl or t-butyl.

Typically, a mixture of the polyoxyalkylene component-bearing diester and the polyoxyalkylene component-bearing monoester with the polyglycidol derivative and the ion-conductive salt is heated or exposed to a suitable form of radiation, such as UV light, electron beams, x-rays, gamma rays, microwaves or radio-frequency radiation, so as to form a semi-IPN type three-dimensional crosslinked network structure.

The semi-IPN structure can generally be formed by adding only a polyoxyalkylene component-bearing diester to the polyglycidol derivative serving as component A and carrying out polymerization. However, as already noted, the addition of a polyoxyalkylene component-bearing monoester, which is a monofunctional monomer, to the polyoxyalkylene component-bearing diester is preferred because such addition introduces polyoxyalkylene branched chains into the three-dimensional network.

No particular limitation is imposed on the relative proportions of the polyoxyalkylene component-bearing diester and the polyoxyalkylene component-bearing monoester, although a weight ratio of polyoxyalkylene component-bearing diester to polyoxyalkylene component-bearing monoester within a range of 1 to 0.5, and especially 1 to 0.2, is preferred because this enhances film strength.

The amount of the crosslinkable functional group-bearing compound included as component C is preferably 10 to 500 parts by weight, more preferably 10 to 150 parts by weight, and most preferably 20 to 100 parts by weight, per 100 parts by weight of the polyglycidol derivative serving as component A. The use of less than 10 parts by weight of the crosslinkable functional group-bearing compound may fail to increase the film strength. On the other hand, the use of more than 500 parts by weight may result in a decline in the ability of the matrix as a whole to dissolve the ion-conductive metallic salt, leading to undesirable effects such as settling out of the salt and embrittlement of the formed film.

In addition to above components A, B and C, the second electrolyte composition for electrical double-layer capacitors of the invention may include also a conventional amount of the same types of solvents capable of dissolving the ion-conductive salt as were mentioned above in connection with the first electrolyte composition for electrical double-layer capacitors of the invention.

In the practice of the invention, the composition comprising components A, B and C, in combination with other, optional, ingredients as needed, is heated or exposed to a suitable form of radiation, such as UV light, electron beams, x-rays, gamma rays, microwaves or radio-frequency radiation so as to effect the reaction or polymerization of the crosslinkable functional group-bearing compound serving as component C. The resulting three-dimensional network structure mutually interlocks with molecular chains on the highly branched polyglycidol derivative to form a three-dimensional crosslinked, or semi-interpenetrating, network structure, thereby giving a solid polymer electrolyte for electrical double-layer capacitors according to the invention which has a high ionic conductivity and excellent shape stability.

The semi-IPN structure can generally be formed using a radical polymerization reaction. The polymerization reaction may be carried out without the addition of a polymerization initiator (also referred to below as a "catalyst") when electron beam irradiation is used, although an initiator is ordinarily added in other cases.

No particular limitation is imposed on the polymerization initiator, or catalyst. Examples of photopolymerization initiators that may be used include acetophenone, trichloroacetophenone, 2-hydroxy-2-methylpropiophenone, 2-hydroxy-2-methylisopropiophenone, 1-hydroxycyclohexylketone, benzoin ether, 2,2-diethoxy-acetophenone and benzyl dimethyl ketal.

Examples of thermal polymerization initiators that may be used include high-temperature initiators such as cumene hydroperoxide, t-butyl hydroperoxide, dicumyl peroxide and di-t-butylperoxide; conventional initiators such as benzoyl peroxide, lauroyl peroxide, persulfates and azobisisobutyronitrile; low-temperature initiators (redox initiators) such as hydrogen peroxide-ferrous salts, persulfate-acidic sodium sulfite, cumene hydroperoxide-ferrous salts and benzoyl peroxide-dimethylaniline; and also peroxide-organometallic alkyls, triethylboron, diethylzinc, and oxygen-organometallic alkyls.

These polymerization initiators may be used alone or as mixtures of two or more thereof. The initiator, or catalyst, for the radical polymerization reaction is added in an amount within a range of preferably 0.1 to 1 part by weight, and especially 0.1 to 0.5 part by weight, per 100 parts by weight of the crosslinkable functional group-bearing compound (component C). The addition of less than 0.1 part by weight results in a marked decline in the polymerization rate, whereas the addition of more than 1 part by weight does not further enhance the catalytic effects, and thus amounts merely to a wasteful use of reagent.

Although the polymerization reaction conditions are not subject to any particular limitations, in the case of photopolymerization, for example, reaction is typically carried out by 5 to 30 minutes of exposure to 1 to 50 mW/cm$^2$ of UV light at room temperature and in air.

Polymerization by means of e-beam irradiation is carried out at room temperature and an acceleration voltage of 150 to 300 kV. In the case of thermal polymerization, the reaction is effected by heating at 50 to 120° C. for a period of 0.5 to 6 hours.

In light of such considerations as the simplicity of the apparatus and running costs, the polymerization reaction is preferably carried out by UV irradiation or thermal polymerization.

The solid polymer electrolyte for electrical double-layer capacitors of the invention has a firm semi-IPN structure wherein the highly branched polyglycidol derivative serving as component A is intricately interlocked with the three-dimensional network structure formed by the crosslinkable compound serving as component C. This greatly increases the shape retention of the polymer electrolyte, yet the molecular structure is that of an amorphous polymer and is not crystalline, allowing the ion conductor to move freely within the molecule. Moreover, the polymer electrolyte of the invention has a high conductivity of about $10^{-3}$ to $10^{-4}$ S/cm at room temperature and is not subject to evaporation or leakage, thereby making it highly suitable for use as an electrolyte (separator) for electrical double-layer capacitors.

The solid polymer electrolyte for electrical double-layer capacitors of the invention may be processed by, for example, coating a liquid mixture of above components A to C and a suitable diluting agent onto a substrate, then subjecting the crosslinkable functional group-bearing compound serving as component C to a crosslinking reaction so as to induce film formation. An electrolyte film of uniform thickness can be obtained by using a suitable means such as roller coating with an applicator roll, screen coating, doctor blade coating, spin coating or bar coating.

The polar electrode compositions to which the invention is also directed have the following first and second sets of constituent components.

A first polar electrode composition according to the invention is composed primarily of (A) a polymeric compound which is a polyglycidol derivative, (D) a high surface area material, and (E) an electrically conductive material.

A second polar electrode composition according to the invention is composed primarily of (A) a polymeric compound which is a polyglycidol derivative, (C) a compound having crosslinkable functional groups, (D) a high surface area material, and (E) an electrically conductive material.

The polyglycidol derivative-type polymeric compound used as component A of the first polar electrode composition according to the invention may be the same as the polyglycidol derivative-type polymeric compound serving as component A in the above-described first and second electrolyte compositions for electrical double-layer capacitors according to the invention.

The high surface area material serving as component D is typically a carbon material having a specific surface area of preferably at least 500 m$^2$/g, more preferably at least 1,000 m$^2$/g, and most preferably from 1,500 to 3,000 m$^2$/g, and having an average particle size of preferably not more than 30 μm, and especially from 5 to 30 μm. At a specific surface area and an average particle size outside the above respective ranges, it may be difficult to achieve an electrical double-layer capacitor having a large electrostatic capacitance and a low resistance.

The high surface area material is most preferably an activated carbon. Exemplary activated carbons include those manufactured from plant-based materials such as wood, sawdust, coconut shells and pulp spent liquor; fossil fuel-based materials such as coal and petroleum fuel oil, as well as fibers spun from coal or petroleum-based pitch obtained by the hydrolysis of such fossil fuel-based materials or from tar pitch; and synthetic polymers, phenol resins, furan resins, polyvinyl chloride resins, polyvinylidene chloride resins, polyimide resins, polyamide resins, liquid-crystal polymers, plastic waste and reclaimed tire rubber. These starting materials are carbonized, then activated. There are two major kinds of activation processes: gas activation and chemical activation. In gas activation, the carbonized feedstock is catalytically reacted at an elevated temperature with an oxidizing gas such as steam, carbon dioxide or oxygen to form activated carbon. In chemical activation, the feedstock is uniformly impregnated with an activating chemical agent and heated in an inert gas atmosphere. The chemical agent induces a dehydrating and oxidizing reaction which produces an activated carbon. Examples of chemical agents that may be used for this purpose include zinc chloride, phosphoric acid, sodium phosphate, calcium chloride, potassium sulfate, potassium hydroxide, sodium hydroxide, potassium carbonate, sodium carbonate, sodium sulfate, potassium sulfate and calcium carbonate. The activated carbon may be in any of various forms, including ground or granulated particles, fibers, felt, woven fabric or sheet, any of which may be used in the present invention. Activated carbons prepared by chemical activation using KOH are especially preferred because they tend to provide a larger electrostatic capacitance than steam-activated product.

The amount of the high surface area material included as component D is preferably from 800 to 2,300 parts by weight, and especially 1,300 to 2,000 parts by weight, per 100 parts by weight of the polyglycidol derivative serving as component A. The addition of too much high surface area material may lower the bond strength of the polar electrode composition, resulting in poor adhesion to the current collector. On the other hand, too little high surface area material may have the effect of increasing the resistance and lowering the electrostatic capacitance of polar electrodes produced from the composition.

The electrically conductive material used as component E may be any suitable material capable of conferring electrical conductivity to the polar electrode composition. Illustrative examples include carbon black, Ketjenblack, acetylene black, carbon whiskers, carbon fibers, natural graphite, artificial graphite, titanium oxide, ruthenium oxide, and metallic fibers such as aluminum or nickel. Any one or combinations of two or more thereof may be used. Of these, Ketjenblack and acetylene black, which are both types of carbon black, are preferred. The average particle size of the conductive material powder is preferably 10 to 100 nm, and especially 20 to 40 nm.

The amount of conductive material serving as component E is preferably 50 to 500 parts by weight, and especially 100 to 300 parts by weight, per 100 parts by weight of the polyglycidol derivative serving as component A. The presence of too much conductive material in the composition reduces the proportion of the high surface area material, which may lower the electrostatic capacitance of the polar electrode obtained from the composition. On the other hand, the addition of too little conductive material may fail to confer adequate electrical conductivity.

In addition to above components A, D and E, the first polar electrode composition according to the invention may include also a diluting solvent. Illustrative examples of suitable diluting solvents include N-methyl-2-pyrrolidone, acetonitrile, tetrahydrofuran, acetone, methyl ethyl ketone, 1,4-dioxane and ethylene glycol dimethyl ether. Preferably, the diluting solvent is added in an amount of 80 to 150 parts by weight per 100 parts by weight of the overall polar electrode composition.

The polyglycidol derivative-type polymeric compound used as component A of the second polar electrode composition according to the invention may be of the same type as the polyglycidol derivative-type polymeric compound used as component A of the earlier-described first and second electrolyte compositions for electrical double-layer capacitors according to the invention. The compound having crosslinkable functional groups which is used herein as component C may be of the same type as the compound having crosslinkable functional groups used as component C in the earlier-described second electrolyte composition for electrical double-layer capacitors. Moreover, the high surface area material serving as component D and the electrically conductive material serving as component E may be of the same respective types as components D and E in the above-described first polar electrode composition of the invention.

The compound having crosslinkable functional groups which serves as component C is included in an amount of 10 to 100 parts by weight, and preferably 20 to 80 parts by weight, per 100 parts by weight of the polyglycidol derivative serving as component A. The high surface area material serving as component D and the electrically conductive material serving as component E may be included in the same amounts as indicated above with reference to the first polar electrode composition of the invention.

The polar electrode compositions of the invention have excellent binder capabilities which can strongly bond the high surface area material and the electrically conductive material to the current collector.

The invention relates also to polar electrodes which are produced by coating the above first and second polar electrode compositions of the invention onto a current collector.

The current collector is preferably one made of metal. Illustrative examples of metallic current collectors include those made of aluminum, titanium, tantalum or stainless steel. Aluminum and stainless steel are highly suitable because of their high corrosion resistance, and aluminum is especially advantageous on account also of its light weight and low electrical resistance.

The current collector may be in any suitable form, such as a foil, expanded metal, a sheet of sintered metal fiber or a sheet of foam metal. A foil-type collector having a thickness of 20 to 100 $\mu$m is especially advantageous because it is easy to roll or stack and relatively inexpensive. When a metal foil is employed as the current collector, it is desirable to use a chemical, electrochemical or physical means to roughen the surface because this improves the closeness of contact between the polar electrode and the metal collector and lowers resistance.

The polar electrode of the invention may be formed by applying the first or second polar electrode composition onto the current collector to a uniform thickness using a suitable means such as roller coating with an applicator roll, screen coating, doctor blade coating, spin coating or bar coating.

In cases where the second polar electrode composition is used, a polar electrode according to the invention can be obtained in a semisolid state by coating the composition onto the current collector, then heating the coated collector at 60 to 100° C. for 1 to 6 hours.

The invention is also directed at an electrical double-layer capacitor comprised of a pair of polar electrodes with a separator disposed therebetween. Polar electrodes produced as described above by coating the first or second polar electrode composition of the invention onto a current collector are used as the pair of polar electrodes in the capacitor, with both electrodes in the pair preferably being of the same construction.

A first type of separator that may be used in the inventive capacitor is produced by impregnating a separator substrate with an ion-conductive salt-containing solution. The separator substrate may be a material commonly used as a separator substrate in electrical double-layer capacitors. Illustrative examples include polyethylene nonwoven fabric, polypropylene nonwoven fabric, polyester nonwoven fabric, PTFE porous film, kraft paper, sheet laid from a blend of rayon fibers and sisal fibers, manila hemp sheet, glass fiber sheet, cellulose-based electrolytic paper, paper made from rayon fibers, paper made from a blend of cellulose and glass fibers, and combinations thereof in the form of multilayer sheets.

The ion-conductive salt-containing solution is composed of an ion-conductive salt and a solvent capable of dissolving the salt, which may be of the same type as the ion-conductive salt and the solvent thereof exemplified above in connection with the earlier-described first electrolyte composition for electrical double-layer capacitors of the invention. The concentration of ion-conductive salt in the ion-conductive salt-containing solution is preferably 0.5 to 2.5 mol/L.

The separator produced by impregnating the separator substrate with this ion-conductive salt-containing solution may be placed between a pair of the inventive polar electrodes and a given force applied to give an electrical double-layer capacitor according to the invention.

A second type of separator that may be used herein is produced by coating or impregnating a separator substrate with the above-described first or second electrolyte composition for electrical double-layer capacitors of the invention. The separator substrate used in this case may be any of those mentioned above.

Specifically, a separator produced by coating or impregnating the separator substrate with the first or second electrolyte composition for electrical double-layer capacitors of the invention is placed between a pair of the inventive polar electrodes and a given pressure is applied to form an electrical double-layer capacitor according to the invention.

Alternatively, a separator produced by coating or impregnating the separator substrate with the second electrolyte composition for electrical double-layer capacitors of the invention is placed between a pair of the inventive polar electrodes and a given pressure is applied, following which the resulting assembly is heated at 60 to 100° C. for 1 to 8 hours to effect curing, thereby forming an electrical double-layered capacitor according to the invention.

A third type of separator that may be used herein is composed of a solid polymer electrolyte layer obtained from the first or second electrolyte composition for electrical double-layer capacitors of the invention. In this case, the polyglycidol derivative-type polymeric compound used as component A in the first or second electrolyte composition for electrical double-layer capacitors of the invention is preferably one which has a large weight-average molecular weight (the weight-average molecular weight being at least 3,000, and preferably at least 10,000) and is in a solid or semisolid form.

Specifically, the first or second electrolyte composition for electrical double-layer capacitors of the invention is applied onto the surface of a polar electrode to a uniform thickness by a suitable means such as roller coating with an applicator roll, screen coating, doctor blade coating, spin coating or bar coating, and is cast using a doctor knife applicator. Next, another polar electrode of the same construction is placed against this cast side and a pressure is applied to the assembly such as to impart a predetermined thickness, thereby giving an electrical double-layer capacitor according to the invention.

A fourth type of separator that may be used is composed of a solid polymer electrolyte layer produced by curing the second electrolyte composition for electrical double-layer capacitors of the invention. In this case, the second electrolyte composition for electrical double-layer capacitors of the invention is applied onto the surface of a polar electrode of the invention to a uniform thickness by a suitable means such as roller coating with an applicator roll, screen coating, doctor blade coating, spin coating or bar coating, and is cast using a doctor knife applicator. Next, another polar electrode of the same construction is placed against this cast side and a pressure is applied to the assembly such as to impart a predetermined thickness. The assembly is then heated at 60 to 100° C. for 1 to 8 hours to effect curing, thereby yielding an electrical double-layer capacitor according to the invention.

In the electrical double-layer capacitor of the invention, the use of current collectors coated with the first or second polar electrode composition as the pair of polar electrodes imparts excellent binder capabilities which can strongly bond the high surface area material and the electrically conductive material to the current collector. Moreover, the use in particular of the first or second electrolyte composition for electrical double-layer capacitors as the separator situated between the pair of polar electrodes means that the polar electrodes and the separator (electrolyte composition for electrical double-layer capacitor, or solid polymer electrolyte) share some of the same constituents. This can have the effect of lowering the interfacial resistance between the polar electrodes and the separator, making it possible to obtain a high-quality electrical double-layer capacitor endowed with outstanding characteristics, including a high capacitance and a long life.

No particular limitation is imposed on the shape of the electrical double-layer capacitor of the invention, although a film-like capacitor is preferred. One typical capacitor shape that may be used is a cylindrical shape arrived at by winding a continuous length of separator between a pair of continuous lengths of electrode to form an element, impregnating the element with a nonaqueous electrolyte solution, and enclosing the impregnated element in a cylindrical closed-end case. Another typical capacitor shape that may be used is a rectangular shape arrived at by alternately stacking a plurality of rectangular electrodes as the positive and negative electrodes with separators therebetween to form an element, impregnating the element with a nonaqueous electrolyte solution, and enclosing the impregnated element in a rectangular closed-end case.

The electrical double-layer capacitor of the invention is well-suited for use in a variety of applications, including memory backup power supplies for electronic equipment such as personal computers and portable electronic devices, power supplies to protect personal computers and other equipment from sudden power outages, in electric cars and hybrid cars, with solar cells as energy storage systems for solar power generation, and in combination with batteries as load-leveling power supplies.

EXAMPLE

The following synthesis examples, examples of the invention and comparative examples, wherein all parts are by weight, are provided to illustrate the invention, and are not intended to limit the scope thereof.

Synthesis Example 1

Polyglycidol Preparation (1)

A glycidol-containing flask was charged with methylene chloride to a glycidol concentration of 4.2 mol/L, and the reaction temperature was set at −10° C. Trifluoroborate diethyl etherate (BF$_3$.OEt$_2$) was added as the catalyst (reaction initiator) to a concentration of 1.2×10$^{-2}$ mol/L, and the reaction was carried out by stirring for 3 hours under a stream of nitrogen. Following reaction completion, methanol was added to stop the reaction, and the methanol and methylene chloride were removed by distillation in a vacuum.

The resulting crude polymer was dissolved in water and neutralized with sodium hydrogen carbonate, after which the solution was passed through a column packed with an ion-exchange resin (produced by Organo Corporation under the trade name Amberlite IRC-76). The eluate was passed through 5C filter paper, after which the filtrate was distilled in vacuo and the residue from distillation was dried.

Figure 2:
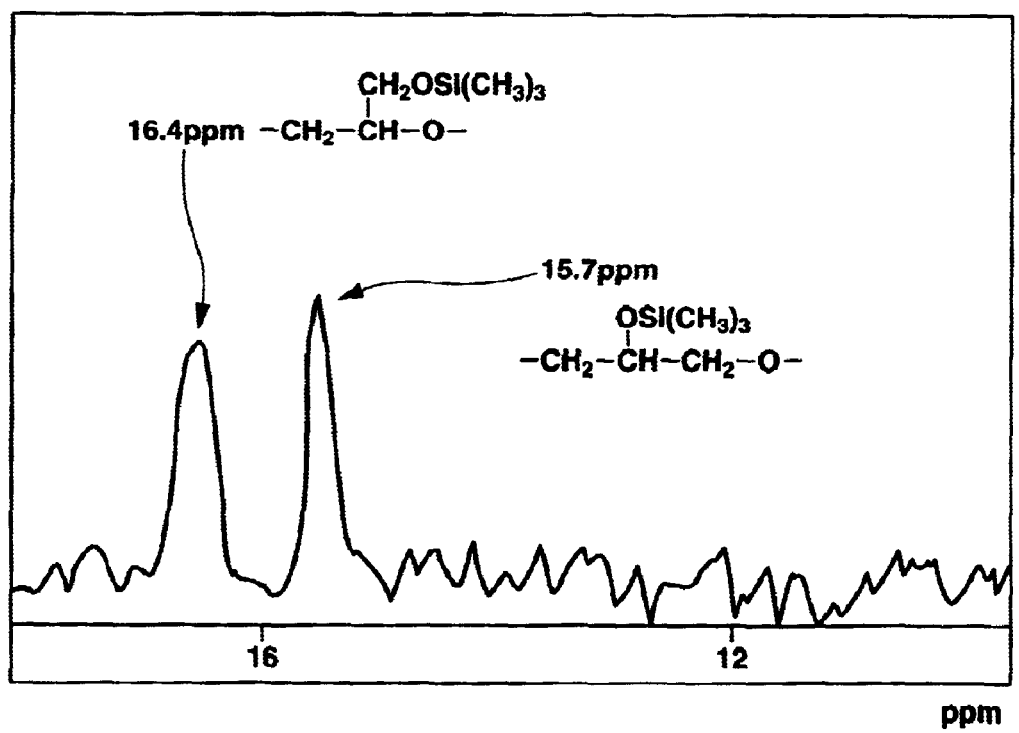
FIG. 2 is a $^{29}$Si-NMR spectrum of trimethylsilylated polyglycidol prepared from the polyglycidol of Synthesis Example 1.

The resulting purified polyglycidol was analyzed by gel permeation chromatography (GPC) using 0.1 M saline as the mobile phase, based upon which the polyethylene glycol equivalent weight-average molecular weight was measured. The crystallinity was determined by wide-angle x-ray diffraction analysis, and the room temperature state of the polymer was visually examined. The results are shown in table 2. In addition, FIG. 2 shows the $^{13}$C-NMR spectrum (DEPT spectrum measured with a Varian VXR-300 NMR spectrometer, using D$_2$O as the solvent).

Synthesis Examples 2 to 8

Using the quantities, reaction times and temperatures shown in Table 1, polyglycidol was prepared in each example by the same method as in Synthesis Example 1.

In each case, the resulting polyglycidol was analyzed by GPC using 0.1 M saline as the mobile phase, based upon which the polyethylene glycol equivalent weight-average molecular weight was measured. The crystallinity was determined by wide-angle x-ray diffraction analysis, and the room temperature state of the polymer was visually examined. The results are shown in Table 2.

TABLE 1

| | Glycidol conc. (mol/L) | Catalyst | Catalyst conc. (mol/L) | Solvent | Temp. (° C.) | Reaction time (hrs) |
|---|---|---|---|---|---|---|
| Syn. Ex. 1 | 4.2 | BF$_3$.OEt$_2$ | 1.2 × 10$^{-2}$ | methylene chloride | −10 | 3 |
| Syn. Ex. 2 | 4.2 | BF$_3$.OEt$_2$ | 1.2 × 10$^{-2}$ | methylene chloride | 10 | 3 |
| Syn. Ex. 3 | 4.2 | BF$_3$.OEt$_2$ | 1.2 × 10$^{-2}$ | methylene chloride | 30 | 3 |
| Syn. Ex. 4 | 16 | BF$_3$.OEt$_2$ | 9.2 × 10$^{-3}$ | none | −10 | 48 |
| Syn. Ex. 5 | 16 | SnCl$_4$ | 1.6 × 10$^{-2}$ | none | −20 | 8 |
| Syn. Ex. 6 | 4.5 | SnCl$_4$ | 8.2 × 10$^{-3}$ | methylene chloride | −20 | 8 |
| Syn. Ex. 7 | 15 | HPF$_6$.OEt$_2$ | 9.0 × 10$^{-3}$ | none | −10 | 48 |
| Syn. Ex. 8 | 15 | HPF$_6$.OEt$_2$ | 1.8 × 10$^{-3}$ | none | −10 | 56 |

TABLE 2

| | Weight-average molecular weight | Crystallinity | Room temperature state |
|---|---|---|---|
| Syn. Ex. 1 | 6,250 | amorphous | soft, paste-like solid |
| Syn. Ex. 2 | 3,240 | amorphous | soft, paste-like solid |

TABLE 2-continued

| | Weight-average molecular weight | Crystallinity | Room temperature state |
|---|---|---|---|
| Syn. Ex. 3 | 1,060 | amorphous | viscous liquid |
| Syn. Ex. 4 | 13,940 | amorphous | soft, paste-like solid |
| Syn. Ex. 5 | 9,840 | amorphous | soft, paste-like solid |
| Syn. Ex. 6 | 13,400 | amorphous | soft, paste-like solid |
| Syn. Ex. 7 | 15,370 | amorphous | soft, paste-like solid |
| Syn. Ex. 8 | 21,530 | amorphous | soft, paste-like solid |

Synthesis Example 9

Polyglycidol Preparation (2)

A flask was charged with 100 parts of glycidol, 1,000 parts of methylene chloride was added, and the reaction temperature was set at 20° C. Potassium hydroxide (20 parts) was added as the catalyst and the mixture was stirred for 22 hours to effect the reaction. Following reaction completion, methanol was added to stop the reaction, after which the methanol and methylene chloride were distilled off in a vacuum.

The resulting crude polymer was dissolved in water and neutralized with an ion-exchange resin (Amberlite IRC-76, produced by Organo Corporation). The ion-exchange resin was separated from the polymer solution by filtration, following which the water was removed from the solution by distillation in a vacuum then drying.

The resulting purified polyglycidol was analyzed by GPC using 0.1 M saline as the mobile phase, and the polyethylene glycol equivalent weight-average molecular weight was measured. The crystallinity was determined by wide-angle x-ray diffraction analysis, and the room temperature state of the polymer was visually examined. The results are shown in Table 4.

Synthesis Examples 10 and 11

Using the quantities, reaction times and temperatures shown in Table 3, polyglycidol was prepared in each example by the same method as in Synthesis Example 9. In addition, glycerol was used in Synthesis Example 10, and ethanolamine in Synthesis Example 11, as the active hydrogen compound.

In each case, the resulting polyglycidol was analyzed by GPC using 0.1 M saline as the mobile phase, and the polyethylene glycol equivalent weight-average molecular weight was measured. The crystallinity was determined by wide-angle x-ray diffraction analysis, and the room temperature state of the polymer was visually examined. The results are shown in Table 4.

TABLE 3

| | Solvent | Active hydrogen compound | (pbw) | Amount of KOH charged (pbw) | Temp. (° C.) | Reaction time (hours) |
|---|---|---|---|---|---|---|
| Syn. Ex. 9 | methylene chloride | none | — | 20 | 20 | 22 |
| Syn. Ex. 10 | methylene chloride | glycerol | 2 | 5.5 | 20 | 24 |
| Syn. Ex. 11 | methylene chloride | ethanolamine | 2 | 2 | 10 | 48 |

TABLE 4

|  | Weight-average molecular weight | Crystallinity | Room temperature state |
|---|---|---|---|
| Syn. Ex. 9 | 1,100 | amorphous | viscous liquid |
| Syn. Ex. 10 | 1,020 | amorphous | viscous liquid |
| Syn. Ex. 11 | 1,140 | amorphous | viscous liquid |

Synthetic Example 12
Cyanoethylation of Polyglycidol

Three parts of the polyglycidol prepared in Synthesis Example 9 was mixed with 20 parts of dioxane and 14 parts of acrylonitrile. To this mixed solution was added aqueous sodium hydroxide comprising 0.16 part of sodium hydroxide dissolved in 1 part of water, and stirring was carried out for 10 hours at 25° C. to effect the reaction. After reaction completion, 20 parts of water was added to the mixture, which was then neutralized using an ion-exchange resin (Amberlite IRC-76, produced by Organo Corporation). The ion-exchange resin was separated off by filtration, after which 50 parts of acetone was added to the solution and the insolubles were filtered off. The filtrate was vacuum condensed, yielding crude cyanoethylated polyglycidol. The crude cyanoethylated polyglycidol was dissolved in acetone and the solution was filtered using 5 A filter paper, following which the polyglycidol was precipitated out of solution in water and the precipitate was collected. These two operations (dissolution in acetone, and precipitation in water) were repeated twice, following which the product was dried in vacuo at 50° C., giving purified cyanoethylated polyglycidol.

The infrared absorption spectrum of the purified cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. In addition, the room temperature state of the polyglycidol was visually examined. The results are shown in Table 5.

Synthesis Example 13
Cyanoethylation of Polyglycidol

Purified cyanoethylated polyglycidol was prepared by the same method as in Synthesis Example 12 using the polyglycidol prepared in Synthesis Example 1.

The infrared absorption spectrum of the purified cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. In addition, the room temperature state was visually examined. The results are shown in Table 5.

Synthesis Example 14
Cyanoethylation of Polyglycidol

Purified cyanoethylated polyglycidol was prepared by the same method as in Synthesis Example 12 using the polyglycidol obtained in Synthesis Example 8.

The infrared absorption spectrum of the purified cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. In addition, the room temperature state was visually examined. The results are shown in Table 5.

Synthesis Example 15
Cyanoethyl/Trimethylsilylation of Polyglycidol

Three parts of the polyglycidol prepared in Synthesis Example 1 was mixed with 20 parts of dioxane and 14 parts of acrylonitrile. To this mixed solution was added aqueous sodium hydroxide comprising 0.16 part of sodium hydroxide dissolved in 1 part of water, and stirring was carried out for 5 hours at 25° C. to effect the reaction. After reaction completion, 20 parts of water was added to the mixture, which was then neutralized using an ion-exchange resin (Amberlite IRC-76, produced by Organo Corporation). The ion-exchange resin w as separated off by filtration, after which 50 parts of acetone was added to the solution and the insolubles were filtered off. The filtrate was vacuum condensed, yielding crude cyanoethylated polyglycidol. One part of the crude cyanoethylated polyglycidol was dissolved in dimethylacetamide, following which 2 parts of bis (trimethylsilyl)acetamide was added to the solution, and stirring was carried out at room temperature for 5 hours.

The reaction mixture was cooled in an ice-water bath, and poured into a methanol/water (4:1) solution that had been cooled to 0° C. The precipitate that settled out was collected by filtration, then dissolved in acetamide. The resulting solution was passed through 5C filter paper, then dried in vacuo, yielding cyanoethyl/trimethylsilylated polyglycidol.

The infrared absorption spectrum of the cyanoethyl/trimethylsilylated polyglycidol showed no hydroxyl group absorption. Results from elemental analysis indicated that the proportion of hydroxyl groups which had been cyanoethylated was 87%, and that the remaining 13% of hydroxyl groups had been trimethylsilylated. Wide-angle x-ray diffraction analysis to determine the crystallinity showed that the product was amorphous at room temperature.

In addition, the room temperature state was visually examined. The results are shown in Table 5.

Synthesis Example 16
Acetylation of Polyglycidol

One part of the polyglycidol prepared in Synthesis Example 1 was mixed with 30 parts of acetic acid and 30 parts of methylene chloride. To this mixed solution were added 0.4 part of a 60% perchloric acid solution in water and 40 parts of anhydrous acetic acid, and stirring was carried out at room temperature for 8 hours. The reaction mixture was poured into cold water, and the precipitate that settled out was collected. The precipitate was dissolved in acetone and poured once again into water, then neutralized by adding sodium hydrogen carbonate and subsequently filtered with 5C filter paper. The precipitate was collected, placed together with water in dialysis tubing, and dialyzed for 3 days with ion-exchanged water. The resulting precipitate was collected, rinsed with water and dried in vacuo, yielding acetylated polyglycidol.

The infrared absorption spectrum of the acetylated polyglycidol showed no hydroxyl group absorption. However, C=O group absorption was observed, indicating that all the hydroxyl groups had been acetylated. Wide-angle x-ray diffraction analysis to determine the crystallinity showed that the product was amorphous at room temperature. In addition, the room temperature state was visually examined. The results are shown in Table 5.

Synthesis Example 17
Cyanobenzoylation of Polyglycidol

The polyglycidol prepared in Synthesis Example 1 (0.4 part) was mixed with dioxane (10 parts by weight), following which pyridine (1.24 parts) was added. To this was added dropwise a solution of cyanobenzoyl chloride (2.05 parts) in dioxane (10 parts). The solution was set at a temperature of 80° C. and reacted for 12 hours. The reaction mixture was poured into a methanol/water (3:4) solution and the precipitate that settled out was collected. The precipitate was dissolved in N,N-dimethylsulfoxide, the resulting solution was placed in dialysis tubing, and dialysis was carried out for 3 days with ion-exchanged water. The resulting precipitate was collected, rinsed with water and dried in vacuo, yielding cyanobenzoylated polyglycidol.

The infrared absorption spectrum of the cyanobenzoylated polyglycidol showed no hydroxyl group absorption. However, C=O and C≡N group absorption were observed, indicating that all the hydroxyl groups had been cyanobenzoylated. Wide-angle x-ray diffraction analysis to determine the crystallinity showed that the product was amorphous at room temperature. In addition, the room temperature state was visually examined. The results are shown in Table 5.

TABLE 5

|  | Starting polyglycidol (weight-average molecular weight) | Substituent introduced onto terminal hydroxyl groups of polyglycidol | Crystallinity | Room temperature state |
|---|---|---|---|---|
| Syn. Ex. 12 | Syn. Ex. 9 (1,100) | cyanoethyl | amorphous | viscous liquid |
| Syn. Ex. 13 | Syn. Ex. 1 (6,250) | cyanoethyl | amorphous | soft, paste-like solid |
| Syn. Ex. 14 | Syn. Ex. 8 (21,530) | cyanoethyl | amorphous | soft, paste-like solid |
| Syn. Ex. 15 | Syn. Ex. 1 (6,250) | cyanoethyl/ trimethylsilyl | amorphous | soft, paste-like solid |
| Syn. Ex. 16 | Syn. Ex. 1 (6,250) | acetyl | amorphous | soft, paste-like solid |
| Syn. Ex. 17 | Syn. Ex. 1 (6,250) | cyanobenzoyl | amorphous | soft, paste-like solid |

Examples 1 to 6
Electrolyte Compositions for Electrical Double-Layer Capacitors (1):

The respective polyglycidol derivatives prepared in Synthesis Examples 12 to 17 were dissolved together with tetraethylammonium tetrafluoroborate $((C_2H_5)_4NBF_4)$ in tetrahydrofuran such as to set the combined weight of $(C_2H_5)_4NBF_4$ and the polyglycidol derivative in each case at 1 kg per mole of $(C_2H_5)_4NBF_4$. The resulting solution was held under reduced pressure to allow the tetrahydrofuran to evaporate, giving a polyglycidol derivative-supported electrolyte complex (electrolyte composition for electrical double-layer capacitor).

The conductivity of each of the resulting compositions (complexes) was measured by AC impedance measurement in which the composition was placed between two copper sheets separated by a 200 μm gap. The room-temperature state was visually evaluated as either a soft, paste-like solid (S) or a viscous liquid (L). Each composition was subjected to wide-angle x-ray diffraction analysis to determine its crystallinity. In addition, each composition was heated at 100° C. for 5 hours, and the percent weight loss by evaporation was measured. The results are shown in Table 6.

Comparative Example 1

A polyethylene glycol-supported electrolyte complex (electrolyte composition for electrical double-layer capacitors) was prepared by the same method as in Example 1, except that polyethylene glycol having a molecular weight of 200 was used instead of the polyglycidol derivative.

The conductivity of the resulting composition (complex) was measured by AC impedance measurement in which the composition was placed between two copper sheets separated by a 200 μm gap. The room-temperature state was visually evaluated as either a soft, paste-like solid (S) or a viscous liquid (L). The composition was subjected to wide-angle x-ray diffraction analysis to determine its crystallinity. In addition, it composition was heated at 100° C. for 5 hours, and the percent weight loss by evaporation was measured. The results are shown in Table 7.

Comparative Example 2

A polyethylene glycol-supported electrolyte complex (electrolyte composition for electrical double-layer capacitors) was prepared by the same method as in Example 1, except that polyethylene glycol having a molecular weight of 2,000 was used instead of the polyglycidol derivative.

The conductivity of the resulting composition (complex) was measured by AC impedance measurement in which the composition was placed between two copper sheets separated by a 200 μm gap. The room-temperature state was visually evaluated as either a soft, paste-like solid (S) or a viscous liquid (L). The composition was subjected to wide-angle x-ray diffraction analysis to determine its crystallinity. In addition, it was heated at 100° C. for 5 hours, and the percent weight loss by evaporation was measured. The results are shown in Table 7.

TABLE 6

(Amounts are in parts by weight)

| | Examples according to the invention | | | | | |
|---|---|---|---|---|---|---|
| | 1 | 2 | 3 | 4 | 5 | 6 |
| Polymer | | | | | | |
| Synthetic Example 12 | 1 | | | | | |
| Synthetic Example 13 | | 1 | | | | |
| Synthetic Example 14 | | | 1 | | | |
| Synthetic Example 15 | | | | 1 | | |
| Synthetic Example 16 | | | | | 1 | |
| Synthetic Example 17 | | | | | | 1 |
| Electrical conductivity (S/cm) | $8.2 \times 10^{-4}$ | $5.8 \times 10^{-4}$ | $4.3 \times 10^{-4}$ | $5.1 \times 10^{-4}$ | $4.2 \times 10^{-4}$ | $2.7 \times 10^{-4}$ |
| Crystallinity | amorphous | amorphous | amorphous | amorphous | amorphous | amorphous |
| Room temperature state | L | S | S | S | S | S |
| Weight loss on evaporation (%) | <0.1 | <0.1 | <0.1 | <0.1 | <0.1 | <0.1 |

TABLE 7

(Amounts are in parts by weight)

|  | Comparative examples | |
|---|---|---|
|  | 1 | 2 |
| Polymer | | |
| PEG 200 | 1 | |
| PEG 2000 | | 1 |
| Electrical conductivity (S/cm) | $4.7 \times 10^{-5}$ | $2.4 \times 10^{-5}$ |
| Crystallinity | amorphous | amorphous |
| Room temperature state | L | S |
| Weight loss on evaporation (%) | <0.1 | <0.1 |

PEG 200: Polyethylene glycol 200
PEG 2000: Polyethylene glycol 2000
Room-temperature state
S: soft, paste-like solid
L: viscous liquid Examples 7 to 9
Electrolyte Compositions (2) and Solid Polymer Electrolytes (1) for Electrical Double-Layer Capacitors The respective combinations of polyglycidol derivative with tetraethylammonium tetrafluoroborate (($CH_2H_5)_4$NBF$_4$) shown in Table 8 for Examples 7 to 9 were dissolved in tetrahydrofuran. In each example, the resulting solution was held under reduced pressure to allow the tetrahydrofuran to evaporate. Next, given amounts of polyethylene glycol dimethacrylate (number of oxyethylene units=9) and methoxypolyethylene glycol monomethacrylate (number of oxyethylene units=9) were added. Azobisisobutyronitrile was also added, and the ingredients were charged into a reactor such that the amount of $(CH_2H_5)_4NBF_4$ was 1 mole per kilogram of the combined weight of the ingredients.

That is, the ingredients were charged in such a way that the weight of $(CH_2H_5)_4NBF_4$ plus the weight of the polyglycerol derivative plus the weight of polyethylene glycol dimethacrylate plus the weight of methoxypolyethylene glycol monomethacrylate plus the weight of azobisisobutyronitrile was 1 kilogram per mole of $(CH_2H_5)_4NBF_4$, thereby giving the polyglycidol derivative-supported electrolyte complexes (electrolyte compositions for electrical double-layer capacitors) of Examples 7 to 9.

Each of the resulting compositions (complexes) was placed between two copper sheets separated by a 200 μm gap and heated at 80° C. for 2 hours to effect curing, thereby giving a solid cured polymer electrolyte in Examples 7 to 9.

The conductivity of each of the resulting solid polymer electrolytes was measured by AC impedance measurement. Each solid polymer electrolyte was subjected to wide-angle x-ray diffraction analysis to determine its crystallinity, in addition to which its room-temperature state was visually evaluated. Moreover, each composition was heated at 100° C. for 5 hours, and the percent weight loss by evaporation was measured. The results are shown in Table 8.

Examples 10 to 12
Electrolyte Compositions (3) and Solid Polymer Electrolytes (2) for Electrical Double-Layer Capacitors The respective combinations of polyglycidol derivative with tetraethylammonium tetrafluoroborate (($CH_2H_5)_4$NBF$_4$) shown in Table 8 for Examples 10 to 12 were dissolved in tetrahydrofuran. In each example, the resulting solution was held under reduced pressure to allow the tetrahydrofuran to evaporate. Next, a predetermined amount of a polyurethane crosslinking agent was added. The polyurethane crosslinking agent was prepared by mixing together the liquid polyol and the liquid isocyanate shown in Table 8. The liquid polyol was a glycerol-based copolymeric polyol of ethylene oxide and polyethylene oxide in a ratio of 8/2 having a hydroxyl value of 1.215 mg/kg. The liquid isocyanate was polyisocyanate having an isocyanate value of 7.381 mg/k/g.

These ingredients were charged into a reactor such that the combined weight thereof (weight of $(CH_2H_5)_4NBF_5$+ weight of polyglycidol derivative+weight of liquid polyol+ weight of liquid isocyanate) was 1 kilogram per mole of $(CH_2H_5)_4NBF_4$, thereby giving the polyglycidol derivative-supported electrolyte complexes (electrolyte compositions for electrical double-layer capacitors) of Examples 10 to 12.

In each example, the resulting composition (complex) was placed between two copper sheets separated by a 200 μm gap and heated at 80° C. for 2 hours to effect curing, thereby giving a solid cured polymer electrolyte.

The conductivity of each of the resulting solid polymer electrolytes was measured by AC impedance measurement. Each solid polymer electrolyte was subjected to wide-angle x-ray diffraction analysis to determine its crystallinity, in addition to which its room-temperature state was visually evaluated. Moreover, each composition was heated at 100° C. for 5 hours, and the percent weight loss by evaporation was measured. The results are shown in Table 8.

Comparative Example 3

A polyethylene glycol-supported electrolyte complex (electrolyte composition for electrical double-layer capacitors) was prepared by the same method as in Example 8, except that polyethylene glycol having a molecular weight of 2000 was used instead of the polyglycidol derivative, and the crosslinking agent shown in Table 8 was used.

The conductivity of the resulting composition (complex) was measured by AC impedance measurement in which the composition was placed between two copper sheets separated by a 200 μm gap. The composition was subjected to wide-angle x-ray diffraction analysis to determine its crystallinity, in addition to which its room-temperature state was visually evaluated. Moreover, the composition was heated at 100° C. for 5 hours, and the percent weight loss by evaporation was measured. The results are shown in Table 8.

TABLE 8

(Amounts are in parts by weight)

|  | Examples according to the invention | | | | | | Comp. |
|---|---|---|---|---|---|---|---|
|  | 7 | 8 | 9 | 10 | 11 | 12 | Ex. 3 |
| Polymer | | | | | | | |
| Synthetic Example 12 | 1 | | | 1 | | | |
| Synthetic Example 13 | | 1 | | | 1 | | |

TABLE 8-continued (Amounts are in parts by weight)

| | Examples according to the invention | | | | | | Comp. |
|---|---|---|---|---|---|---|---|
| | 7 | 8 | 9 | 10 | 11 | 12 | Ex. 3 |
| Synthetic Example 14 | | | 1 | | | 1 | |
| PEG 2000 | | | | | | | 1 |
| Crosslinking agent 1 | 0.2 | 0.3 | 0.2 | | | | 0.3 |
| Crosslinking agent 2 | 0.2 | 0.3 | 0.3 | | | | 0.3 |
| Crosslinking agent 3 | | | | 0.17 | 0.256 | 0.256 | |
| Crosslinking agent 4 | | | | 0.03 | 0.044 | 0.044 | |
| Crosslinking reaction | heat | heat | heat | heat | heat | heat | heat |
| Electrical conductivity (S/cm) | $6.9 \times 10^{-4}$ | $4.2 \times 10^{-4}$ | $2.6 \times 10^{-4}$ | $6.1 \times 10^{-4}$ | $4.5 \times 10^{-4}$ | $1.3 \times 10^{-4}$ | $1.2 \times 10^{-3}$ |
| Crystallinity | amorphous | amorphous | amorphous | amorphous | amorphous | amorphous | amorphous |
| Room temperature state | S | S | S | S | S | S | S |
| Weight loss on evaporation (%) | <0.1 | <0.1 | <0.1 | <0.1 | <0.1 | <0.1 | <0.1 |

Crosslinking agent 1: Polyethylene glycol dimethacrylate
Crosslinking agent 2: Methoxypolyethylene glycol monomethacrylate
Crosslinking agent 3: Ethylene oxide-polyethylene oxide copolymeric polyol
Crosslinking agent 4: Polyisocyanate
Room-temperature state
S: soft, paste-like solid
L: viscous liquid The electrolyte compositions and solid polymer electrolytes for electrical double-layer capacitors of the invention are endowed with high ionic conductivity and, particularly in Examples 7 to 12, excellent shape retention. Hence, they are very well suited for use as solid polymer electrolytes (separators) for electrical double-layer capacitors.

Example 13
Polar Electrode Composition and Polar Electrode (1)

Phenol-derived activated carbon (manufactured by Kansai Netsukagaku K.K.; specific surface area, 1,860 m²/g; average particle size, 16 μm) as the high surface area material and carbon black (average particle size, 20 nm) as the electrically conductive material were added in a weight ratio (activated carbon/carbon black) of 18:2 and mixed.

The resulting powder mixture, the polyglycidol derivative from Synthesis Example 12, and N-methylpyrrolidone were mixed in a weight ratio (powder mixture/polyglycidol derivative/N-methylpyrrolidone) of 20:1:30 to form a polar electrode composition.

The polar electrode composition was cast onto an aluminum current collector using a doctor knife applicator, then heated at 80° C. for 2 hours to evaporate off the N-methylpyrrolidone, thereby giving a polar electrode.

Example 14
Polar Electrode Composition and Polar Electrode (2)

Phenol-derived activated carbon (manufactured by Kansai Netsukagaku K.K.; specific surface area, 1860 m²/g; average particle size, 16 μm) as the high surface area material and carbon black (average particle size, 20 nm) as a powdery conductive material were added in a weight ratio (activated carbon/carbon black) of 18:2 and mixed.

A binder resin was prepared by adding 0.2 part of polyethylene glycol dimethacrylate (number of oxyethylene units=9; crosslinking agent 1) and 0.2 part of methoxypolyethylene glycol monomethacrylate (number of oxyethylene units=9; crosslinking agent 2) to 1 part of the polyglycidol derivative from Synthesis Example 12, and mixing.

The resulting powder mixture, the binder resin, and N-methylpyrrolidone as the diluting solvent were mixed in a weight ratio (powder mixture/binder resin/N-methylpyrrolidone) of 20:1:30 to form a polar electrode composition.

The resulting polar electrode composition was cast onto an aluminum current collector using a doctor knife applicator, then heated at 80° C. for 2 hours to evaporate off the N-methylpyrrolidone, thereby giving a polar electrode.

Example 15
Electrical Double-Layer Capacitor (1):

A separator composed of a separator substrate (PTFE porous film) impregnated with a 1 mol/L solution of tetraethylammonium tetrafluoroborate $((C_2H_5)_4NBF_4)$ dissolved in the nonaqueous solvent propylene carbonate was placed between a pair of the polar electrodes obtained in Example 13 and pressure was applied, giving a film-type electrical double-layer capacitor.

The resulting film-type electrical double-layer capacitor had an aluminum current collector/polar electrode/separator/polar electrode/aluminum current collector construction, was capable of being charged and discharged, and functioned effectively as an electrical double-layer capacitor.

Example 16
Electrical Double-Layer Capacitor (2)

A separator composed of a separator substrate (PTFE porous film) impregnated with a 1 mol/L solution of tetraethylammonium tetrafluoroborate $((C_2H_5)_4NBF_4)$ dissolved in the nonaqueous solvent propylene carbonate was placed between a pair of the polar electrodes obtained in Example 14 and pressure was applied, giving a film-type electrical double-layer capacitor.

The resulting film-type electrical double-layer capacitor had an aluminum current collector/polar electrode/separator/polar electrode/aluminum current collector construction, was capable of being charged and discharged, and functioned effectively as an electrical double-layer capacitor.

Example 17
Electrical Double-Layer Capacitor (3)

A separator composed of a separator substrate (PTFE porous film) coated or impregnated with the electrolyte composition for electrical double-layer capacitors of Example 1 was placed between a pair of the polar electrodes obtained in Example 13 and pressure was applied, giving a film-type electrical double-layer capacitor.

The resulting film-type electrical double-layer capacitor had an aluminum current collector/polar electrode/separator/polar electrode/aluminum current collector construction, was capable of being charged and discharged, and functioned effectively as an electrical double-layer capacitor.

Example 18
Electrical Double-Layer Capacitor (4)

A separator composed of a separator substrate (PTFE porous film) coated or impregnated with the electrolyte composition for electrical double-layer capacitors of Example 1 was placed between a pair of the polar electrodes obtained in Example 14 and pressure was applied, giving a film-type electrical double-layer capacitor.

The resulting film-type electrical double-layer capacitor had an aluminum current collector/polar electrode/separator/polar electrode/aluminum current collector construction, was capable of being charged and discharged, and functioned effectively as an electrical double-layer capacitor.

Example 19
Electrical Double-Layer Capacitor (5)

A separator composed of a separator substrate (PTFE porous film) coated or impregnated with the electrolyte composition for electrical double-layer capacitors of Example 7 was placed between a pair of the polar electrodes obtained in Example 14 and pressure was applied, following which the assembly was heated at 80° C. for 2 hours. This caused the composition of Example 7 within the separator disposed between the pair of polar electrodes of Example 14 to thermally polymerize and form a film-type electrical double-layer capacitor.

The resulting film-type electrical double-layer capacitor had an aluminum current collector/polar electrode/electrolyte (separator)/polar electrode/aluminum current collector construction, was capable of being charged and discharged, and functioned effectively as an electrical double-layer capacitor.

Example 20
Electrical Double-Layer Capacitor (6)

The electrolyte composition for electrical double-layer capacitors of Example 1 was placed in a slight excess on the surface of the polar electrode produced in Example 13, another polar electrode of the same construction was stacked on top thereof, and pressure was applied such as to make the gap between the two polar electrodes 25 μm, thereby forming a film-type electrical double-layer capacitor.

The resulting film-type electrical double-layer capacitor had an aluminum current collector/polar electrode/solid polymer electrolyte layer/polar electrode/aluminum current collector construction, was capable of being charged and discharged, and functioned effectively as an electrical double-layer capacitor.

Example 21
Electrical Double-Layer Capacitor (7)

The electrolyte composition for electrical double-layer capacitors of Example 7 was placed in a slight excess on the surface of the polar electrode produced in Example 13, another polar electrode of the same construction was stacked on top thereof, and pressure was applied such as to make the gap between the two polar electrodes 25 μm, thereby forming a film-type electrical double-layer capacitor.

The resulting film-type electrical double-layer capacitor had an aluminum current collector/polar electrode/solid polymer electrolyte layer/polar electrode/aluminum current collector construction, was capable of being charged and discharged, and functioned effectively as an electrical double-layer capacitor.

Example 22
Electrical Double-Layer Capacitor (8)

The electrolyte composition for electrical double-layer capacitors of Example 7 was placed in a slight excess on the surface of the polar electrode produced in Example 14, another polar electrode of the same construction was stacked on top thereof, pressure was applied such as to make the gap between the two polar electrodes 25 μm, and the assembly was heated at about 80° C. for 2 hours to effect curing.

This caused the electrolyte composition disposed between the pair of polar electrodes to thermally polymerize and form a solid polymer electrolyte layer, thereby giving a film-type electrical double-layer capacitor.

The resulting film-type electrical double-layer capacitor had an aluminum current collector/polar electrode/solid polymer electrolyte layer/polar electrode/aluminum current collector construction, was capable of being charged and discharged, and functioned effectively as an electric double-layer capacitor.

What is claimed is:

1. An electrolyte composition for electrical double-layer capacitors, comprising as main components:

(A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1_3Si$— groups (wherein $R^1$ is as defined above), amino groups, alkylamino groups, and phosphorus atom-containing groups; and (B) an ion-conductive salt

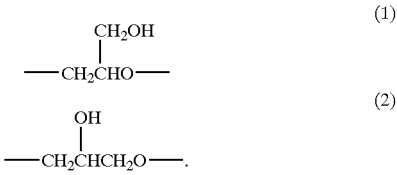

2. An electrolyte composition for electrical double-layer capacitors, comprising as main components:

(A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1_3Si$— groups (wherein $R^1$ is as defined above), amino groups, alkylamino groups, and phosphorus atom-containing groups;

(B) an ion-conductive salt; and (C) a compound having two or more reactive double bonds

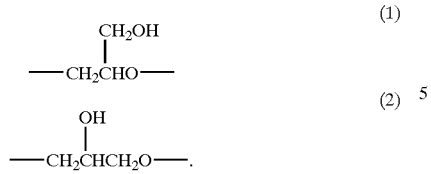

3. The electrolyte composition of claim 1 or 2, wherein the end-capping monovalent groups are cyano group-substituted monovalent hydrocarbon groups or cyano group-substituted monovalent hydrocarbon groups and $R^1_3Si$— groups.

4. A solid polymer electrolyte for electrical double-layer capacitors, which electrolyte has a semi-interpenetrating polymer network structure in which molecular chains on (A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1_3Si$— groups (wherein $R^1$ is as defined above), amino groups, alkylamino groups, and phosphorus atom-containing groups are interlocked with the three-dimensional network structure of a polymer obtained by crosslinking (C) a compound having two or more reactive double bonds, and contains (B) an ion-conductive salt

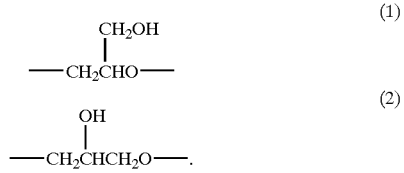

5. A polar electrode composition comprising:
(A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1_3Si$— groups (wherein $R^1$ is as defined above), amino groups, alkylamino groups, and phosphorus atom-containing groups;
(D) a high surface area material; and (E) an electrically conductive material

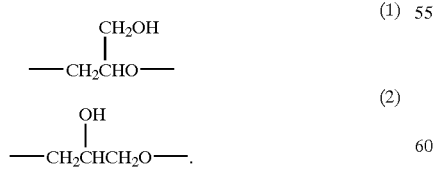

6. A polar electrode composition comprising:
(A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1_3Si$— groups (wherein $R^1$ is as defined above), amino groups, alkylamino groups, and phosphorus atom-containing groups;
(C) a compound having two or more reactive double bonds;
(D) a high surface area material; and (E) an electrically conductive material

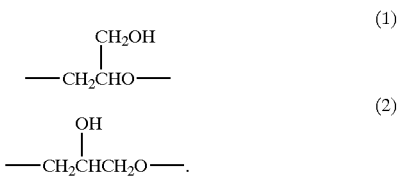

7. The polar electrode composition of claim 5 or 6, wherein the end-capping monovalent groups are cyano group-substituted monovalent hydrocarbon groups or cyano group-substituted monovalent hydrocarbon groups and $R^13Si$— groups.

8. A polar electrode produced by coating the polar electrode composition of claim 7 onto a current collector.

9. An electrical double-layer capacitor comprising a pair of polar electrodes with a separator disposed therebetween, wherein the pair of polar electrodes are polar electrodes according to claim 8 and the separator is composed of a separator substrate impregnated with an ion-conductive salt-containing solution.

10. An electrical double-layer capacitor comprising a pair of polar electrodes with a separator disposed therebetween, wherein the pair of polar electrodes are polar electrodes according to claim 8 and the separator is composed of a separator substrate coated or impregnated with an electrolyte composition for electrical double-layer capacitors comprising as main components of (A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1_3Si$— groups (wherein $R^1$ is as defined above), amino groups, alkylamino groups, and phosphorus atom-containing groups; and (B) an ion-conductive salt

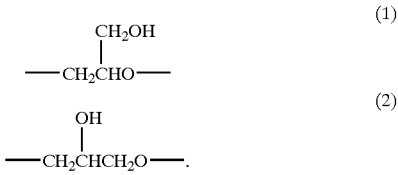

11. The electrical double-layer capacitor according to claim 10, wherein the end-capping monovalent in the electrolyte are composition are cyano group-substituted monovalent hydrocarbon group or cyano group-substituted monovalent hydrocarbon group and $R^1_3Si$— group.

12. An electrical double-layer capacitor comprising a pair of polar electrodes with a separator disposed therebetween, wherein the pair of polar electrodes are polar electrodes according to claim 8 and the separator is composed of a separator substrate coated or impregnated with an electrolyte composition for electrical double-layer capacitors comprising as main components of (A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, and phosphorus atom-containing groups; (B) an ion-conductive salt; and (C) a compound having two or more reactive double bonds

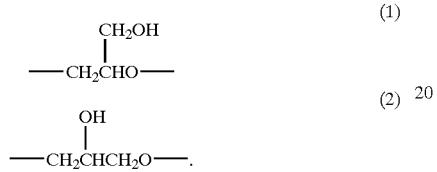

13. The electrical double-layer capacitor according to claim 12, wherein the end-capping monovalent group in the electrolyte composition are cyano group-monovalent hydrocarbon groups or cyano group-substituted monovalent hydrocarbon group and $R^1{}_3Si$— groups.

14. An electrical double-layer capacitor comprising a pair of polar electrodes with a separator disposed therebetween, wherein the pair of polar electrodes are polar electrodes according to claim 8 and the separator is a solid polymer electrolyte layer composed of an electrolyte composition for electrical double-layer capacitors comprising as main components of (A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, and phosphorus atom-containing groups; and (B) an ion-conductive salt

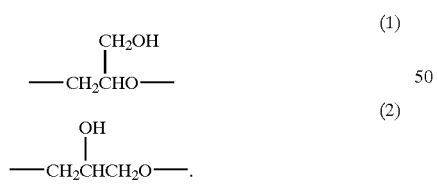

15. The electrical double-layer capacitor according to claim 14, wherein the end-capping monovalent group in the electrolyte composition are cyano group-monovalent hydrocarbon groups or cyano group-substituted monovalent hydrocarbon group and $R^1{}_3Si$— groups.

16. An electrical double-layer capacitor comprising a pair of polar electrodes with a separator disposed therebetween, wherein the pair of polar electrodes are polar electrodes according to claim 8 and the separator is a solid polymer electrolyte layer composed of an electrolyte composition for electrical double-layer capacitors comprising as main components of (A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, and phosphorus atom-containing groups; (B) an ion-conductive salt; and (C) a compound having two or more reactive double bonds

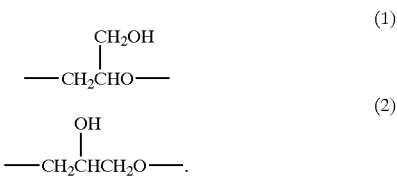

17. The electrical double-layer capacitor according to claim 16, wherein the end-capping monovalent group in the electrolyte composition are cyano group-monovalent hydrocarbon groups or cyano group-substituted monovalent hydrocarbon group and $R^1{}_3Si$— groups.

18. An electrical double-layer capacitor comprising a pair of polar electrodes with a separator disposed therebetween, wherein the pair of polar electrodes are polar electrodes according to claim 8 and the separator is a solid polymer electrolyte for electrical double-layer capacitors having a semi-interpenetrating polymer network structure in which molecular chains on (A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, and phosphorus atom-containing groups are interlocked with the three-dimensional network structure of a polymer obtained by crosslinking (C) a compound having two or more reactive double bonds, and contains (B) an ion-conductive salt

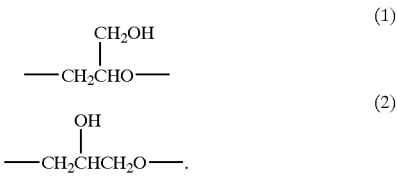

19. A polar electrode produced by coating the polar electrode composition of claim 5 or 6 onto a current collector.

20. An electrical double-layer capacitor comprising a pair of polar electrodes with a separator disposed therebetween, wherein the pair of polar electrodes are polar electrodes according to claim 19 and the separator is composed of a separator substrate impregnated with an ion-conductive salt-containing solution.

21. An electrical double-layer capacitor comprising a pair of polar electrodes with a separator disposed therebetween, wherein the pair of polar electrodes are polar electrodes according to claim 8 and the separator is composed of a separator substrate coated or impregnated with an electrolyte composition for electrical double-layer capacitors comprising as main components of (A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, and phosphorus atom-containing groups; and (B) an ion-conductive salt

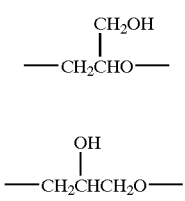

22. The electrical double-layer capacitor according to claim 21, wherein the end-capping monovalent groups in the eletrolyte composition are cyano group-substituted monovalent hydrocarbon groups or cyano group-substituted monovalent hydrocarbon groups and $R^1{}_3Si$— groups.

23. An electrical double-layer capacitor comprising a pair of polar electrodes with a separator disposed therebetween, wherein the pair of polar electrodes are polar electrodes according to claim 19 and the separator is a solid polymer electrolyte layer composed of an electrolyte composition for electrical double-layer capacitors comprising as main components of (A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, and phosphorus atom-containing groups; and (B) an ion-conductive salt

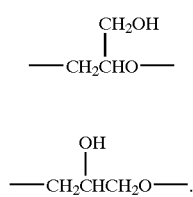

24. The electrical double-layer capacitor according to claim 23, wherein the end-capping monovalent groups in the electrolyte composition are cyano group-substituted monovalent hydrocarbon groups or cyano group-substituted monovalent hydrocarbon groups and $R^1{}_3Si$— groups.

25. An electrical double-layer capacitor comprising a pair of polar electrodes with a separator disposed therebetween, wherein the pair of polar electrodes are polar electrodes according to claim 19 and the separator is composed of a separator substrate coated or impregnated with an electrolyte composition for electrical double-layer capacitors comprising as main components of (A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, and phosphorus atom-containing groups; (B) an ion-conductive salt; and (C) a compound having two or more reactive double bonds

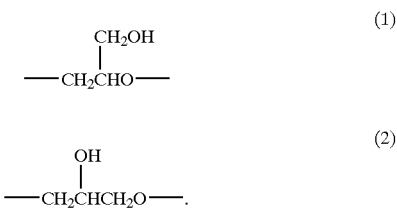

26. The electrical double-layer capacitor according to claim 25, wherein the end-capping monovalent groups in the electrolyte composition are cyano group-substituted monovalent hydrocarbon groups or cyano group-substituted monovalent hydrocarbon groups and $R^1{}_3Si$— groups.

27. An electrical double-layer capacitor comprising a pair of polar electrodes with a separator disposed therebetween, wherein the pair of polar electrodes are polar electrodes according to claim 19 and the separator is a solid polymer electrolyte layer composed of an electrolyte composition for electrical double-layer capacitors comprising as main components of (A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO$— groups (wherein $R^1$ is a substituted or unsubstituted monovalent hydrocarbon group), $R^1{}_3Si$— groups (wherein $R^1$ is as defined above), amino groups, alkylamino groups, and phosphorus atom-containing groups; (B) an ion-conductive salt; and (C) a compound having two or more reactive double bonds

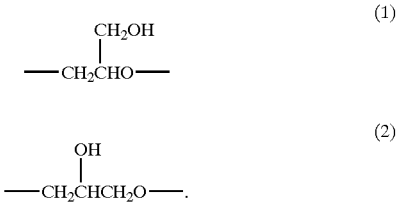

28. The electrical double-layer capacitor according to claim 27, wherein the end-capping monovalent group in the electrolyte composition are cyano group-substituted monovalent hydrocarbon group or cyano group-substituted monovalent hydrocarbon groups and $R^1{}_3Si$— groups.

29. An electrical double-layer capacitor comprising a pair of polar electrodes with a separator disposed therebetween, wherein the pair of polar electrodes are polar electrodes according to claim 19 and the separator is a solid polymer electrolyte for electrical double-layer capacitors having a semi-interpenetrating polymer network structure in which molecular chains on (A) a polymeric compound containing units of the following formula (1) and units of the following formula (2) in which compound at least 10% of the molecular chain ends are capped with one or more type of monovalent group selected from among halogen atoms, substituted and unsubstituted monovalent hydrocarbon groups, $R^1CO-$ groups (wherein $R^1$ is a substituted or unsubstituted monovalent hydrocarbon group), $R^1{}_3Si-$ groups (wherein $R^1$ is as defined above), amino groups, alkylamino groups, and phosphorus atom-containing groups are interlocked with the three-dimensional network structure of a polymer obtained by crosslinking (C) a compound having two or more reactive double bonds, and contains (B) an ion-conductive salt

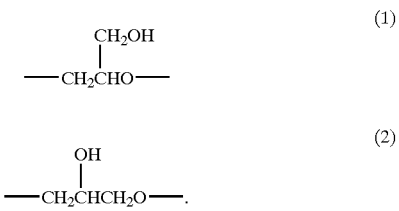

* * * * *